US012380314B2

(12) United States Patent
Dube et al.

(10) Patent No.: US 12,380,314 B2
(45) Date of Patent: Aug. 5, 2025

(54) ARTIFICIAL INTELLIGENCE ENABLED PREFERENCE LEARNING

(71) Applicant: Siemens Healthineers International AG, Steinhausen (CH)

(72) Inventors: Simant Dube, Palo Alto, CA (US); Oskar Radermecker, Palo Alto, CA (US); Parin Dalal, Palo Alto, CA (US); Corey Zankowski, Palo Alto, CA (US)

(73) Assignee: Siemens Healthineers International AG, Steinhausen (CH)

( * ) Notice: Subject to any disclaimer, the term of this patent is extended or adjusted under 35 U.S.C. 154(b) by 1073 days.

(21) Appl. No.: 17/362,728

(22) Filed: Jun. 29, 2021

(65) Prior Publication Data

US 2022/0414428 A1   Dec. 29, 2022

(51) Int. Cl.
*G06N 3/042*  (2023.01)
*G06N 3/08*   (2023.01)
*G06T 7/00*   (2017.01)
*G06T 7/149*  (2017.01)
*G06V 10/44*  (2022.01)

(52) U.S. Cl.
CPC .......... *G06N 3/042* (2023.01); *G06N 3/08* (2013.01); *G06T 7/0012* (2013.01); *G06T 7/149* (2017.01); *G06V 10/44* (2022.01); *G06T 2207/20081* (2013.01); *G06T 2207/20116* (2013.01)

(58) Field of Classification Search
CPC .......... G06N 3/042; G06N 3/08; G06N 3/045; G06N 3/084; G06N 3/006; G06T 7/0012; G06T 7/149; G06T 2207/20081; G06T 2207/20116; G06T 2207/20084; G06T 7/12; G06V 10/44
See application file for complete search history.

(56) References Cited

U.S. PATENT DOCUMENTS

| 11,836,926 | B2 * | 12/2023 | Choi | G06T 7/149 |
| 2019/0012567 | A1 * | 1/2019 | Piper | G06T 7/12 |
| 2022/0414464 | A1 * | 12/2022 | Krishnaswamy | G06N 3/047 |
| 2023/0153633 | A1 * | 5/2023 | Mohalik | G06N 20/00 706/25 |
| 2023/0377195 | A1 * | 11/2023 | Stember | G06T 7/0012 |
| 2024/0020829 | A1 * | 1/2024 | Sousa Ferreira | A61B 1/041 |

(Continued)

OTHER PUBLICATIONS

Baes, Michael et al., "Hedge Algorithm and Subgradient Methods," Institute of Operations Research, ETH Zurich, published Oct. 5, 2010. (Year: 2010).*

(Continued)

*Primary Examiner* — James T Tsai
(74) *Attorney, Agent, or Firm* — Foley & Lardner LLP

(57) ABSTRACT

Embodiments described herein provide for training an artificial intelligence model to become a preference-aware model. The artificial intelligence model preferences as the artificial intelligence model trains. Reinforcement learning is used to train experts in the artificial intelligence model such that each expert is trained to converge to a unique preference. The architecture of the artificial intelligence model is highly flexible. Upon executing a trained model, users can select automatically images according to various preferences based on medical professional preferences, geographic preferences, patient anatomy, and institutional guidelines.

18 Claims, 19 Drawing Sheets

(56) References Cited

U.S. PATENT DOCUMENTS

2024/0177836 A1* 5/2024 Paik .................. A61B 5/742

OTHER PUBLICATIONS

International Search Report and Written Opinion on PCT Appl. Ser. No. PCT/US2022/033945 dated Oct. 11, 2022 (10 pages).
Brouwer et al., 3D Variation in delineation of head and neck, organs at risk, Radiation Oncology 2012, 7:32, http://www.ro-journal.com/content/7/1/32 (Mar. 13, 2012).
Li et al., Variability of target and normal structure delineation for breast cancer radiotherapy: a RTOG multi-institutional and multi-observer study, Int J Radiat Oncol Biol Phys. Mar. 1, 2009; 73(3): 944-951. doi:10.1016/j.ijrobp.2008.10.034.
Shazeer et al., Outrageously Large Neural Networks: The Sparsely-Gated Mixture-Of-Experts Layer, ICLR 2017.
Ji et al., Uncertainty Quantification for Medical Image Segmentation Using Dynamic Label Factor Allocation Among Multiple Raters, Medical Image Computing and Computer Assisted Intervention (MICCAI), Quantification of Uncertainties in Biomedical Image Quantification Challenge (QUBIQ), Oct. 4, 2020 (Oct. 4, 2020), XP055965901.

* cited by examiner

ARTIFICIAL INTELLIGENCE ENABLED PREFERENCE LEARNING

TECHNICAL FIELD

This application relates generally to using artificial intelligence to match preferences to experts and/or mixtures of experts, enabling an artificial intelligence model to learn preferences.

BACKGROUND

Radiotherapy (radiation-based therapy) is used as a cancer treatment to emit high doses of radiation that can kill cells or shrink a tumor. Due to the extreme nature of radiation emitted from the radiation therapy machine, it is imperative that treatment attributes are precisely calculated and followed. The target region of a patient's anatomy that is intended to receive radiation (e.g., tumor) is referred to as the planning target volume (PTV). The goal is to deliver enough radiation to the PTV to kill the cancerous cells during the radiotherapy treatment. However, other organs or anatomical regions that are adjacent to, or surrounding, the PTV can be in the way of radiation beams and can receive enough radiation to damage or harm such organs or anatomical regions. These organs or anatomical regions are referred to as organs at risk (OARs). Usually a medical professional (including a physician, clinician, dosimetrist, oncologist, clinical experts, or radiologist (or some combination)) identifies both the PTV and the OARs prior to radiotherapy using medical images. Medical images may include, for example, computed tomography (CT) images, cone beam CT images (CBCT), four-dimensional CT images (e.g., CT images over time), magnetic resonance imaging (MRI) images, positron emission tomography (PET) images, ultrasound images, images obtained via some other imaging modality, or a combination thereof. The medical professional may manually mark the PTV and/or the OARs on the medical images of the patient's anatomy to generate segmented (or contoured) medical images to be used in radiotherapy treatment, for instance.

An image is segmented (or contoured) when the image is marked to delineate a structure (e.g., PTV, OAR). For example, a line may be drawn around a section of an image and labeled a particular PTV. Everything inside the line may be considered the PTV, while everything outside the line would not be considered the PTV.

However, image segmentation can vary significantly across regions and practitioners. For example, different regions may conventionally follow different contouring guidelines and/or preferences. In some cases, institutions may define their own unique image segmentation guidelines turned for their specific applications and expertise. Further, different medical professionals, whether within a single institution or across many institutions, may also have personal preferences based on their own experience, training, and unique way of interpreting the in pixel information in the images. Even for a particular medical professional, there may be variation in the way segments are drawn on different days. Moreover, differences in patient anatomy and tumor location add different requirements in terms of contour tolerance and personal preference by individual clinicians.

Manual image segmentation may be performed by a team of highly skilled and trained medical professionals to manually delineate PTVs and/or OARs by drawing contours on medical image data. These structures are manually reviewed, possibly requiring adjustment or re-drawing. In many cases, the image contouring of PTVs and/or OARs can be the most time-consuming part of the radiation treatment planning. As discussed herein, image segmentation (or contouring) may be complicated by lack of consensus among different medical professionals and/or clinical regions as to what constitutes "good" image segmentation. In practice, there may be a large variation in the way PTVs and/or OARs are drawn by different medical professionals. The variation may result in uncertainty in target volume size, shape, as well as exact proximity. Manual image segmentation is thus undesirable because human error and/or bias may result in large uncertainty margins associated with PTVs and/or OARs.

Automatic image segmentation uses artificial intelligence (AI) engines to automatically segment images, reducing the bias and subjectivity in segmented images. However, AI models are trained using a training data set which should be consistent to maximize the effectiveness of the AI model learning accurate image segmentation. The variability of manual image segmentation eventually propagates to the AI models in the form of inconsistent training data.

Alternatively, images may be segmented by carefully curating the images in the training dataset such that the images follow a single set of contouring guidelines (or preferences). However, restricting the training dataset to a single set of segmentation guidelines removes all personal and institutional preference from the dataset. Additionally, or alternatively, AI models may be trained to converge to an average structure. However, averaging PTV and/or OAR structures does not consider the institutional, personal, regional or other segmentation preferences. General structures such as those produced by preference unaware models may be of insufficient quality, resulting in a need to start the manual contouring from scratch.

SUMMARY

For the aforementioned reasons, there is a need to customize image segmentation, for instance, based on institutional, regional, patient, and personal segmentation preference such that a medical professional can select the image segmentation preference which meets their specific preference, application, and guideline the best. The embodiments herein employ an AI model to learn image segmentation preferences. Embodiments, however, are not limited solely to using the AI model to learn and perform customizable image segmentation. Generally, the AI model is configured to learn preferences of any function over voxel space. One example of a function is a contour, which is a mask doting inclusion of voxels in a specific organ or tumor volume over voxel space. Another example is radiation dose prediction, which is a prediction or preference of dose over voxel space. Another example is learning dose-gradients over voxel space preferences. The described non-limiting examples of functions statistically use CT or other reconstructing imaging modalities on voxels as priors as the AI model matches preferences to experts (or mixtures of experts).

The AI model is able to reconstruct various preferences based on learning unknown preferences from the training dataset. For example, preference-aware automatic image segmentation is not merely automatically segmenting an image, but instead the creation of segments in a timely manner while allowing a medical professional to personalize (or correct, modify) the segment to their preference or disposition.

Disclosed herein is a highly flexible preference learning AI model. The AI model discovers different preferences present in a training set and creates a trained model that can specialize to different preferences. The trained AI model is a preference-aware AI model that automatically learns preferences on training data and reproduces similar preference schemes on unseen images. For example, the AI model may learn image segmentation preferences and generate segments in accordance with the learned preferences on unknown data. The AI model may also learn other preferences such as dose over the voxel space. The AI model is configured with experts such that each expert is trained to become specialized to a particular preference.

In an embodiment, a method may comprise iteratively training, by a processor, an artificial intelligence model having a plurality of experts, where each expert is configured to predict a unique contoured image for an anatomical region depicted in an image in accordance with a preference attribute, wherein with each iteration, the processor selects an expert from the plurality of experts based on a policy and an epsilon value indicative of a likelihood of an exploration action and an exploitation action, wherein when the epsilon value indicates the exploitation action, the processor selects the expert based on the expert corresponding to a minimum difference between a ground truth image and the predicted unique contoured image generated by the expert, wherein when the epsilon value indicates the exploration action, the processor randomly selects the expert, the randomly selected expert being an expert from the plurality of experts different from the expert corresponding to the minimum difference between the ground truth image and the predicted unique contoured image; and calculates a reward value indicative of a difference between the ground truth image and the predicted unique contoured image generated via the selected expert, wherein the processor iteratively trains the policy until the policy satisfies an accuracy threshold based on maximizing the reward.

The artificial intelligence model may further comprise a common layer that is executed before at least one expert within the plurality of experts, the common layer configured to perform at least one of a group of: normalize at least a part of the image, scale the image, flatten the image, extract features from the image, and transform the dimensionality of the image.

The common layers may learn via a supervised or unsupervised learning protocol. The common layers may also be executed after at least one expert within the plurality of experts.

The method may further comprise training, by the processor, the selected expert using a supervised training protocol.

The method may further comprise revising, by the processor, the epsilon value, such that the likelihood of exploration action is higher or lower than the likelihood of the exploitation action.

Each expert of the artificial intelligence model may correspond to a contouring preference.

Each expert may correspond to an end-user or a group of end-users.

The policy may identify the expert based on the preference attribute present in the ground truth image.

The policy may identify the expert based on an attribute of a patient depicted within the ground truth image.

In another embodiment, a method may comprise executing, by a processor, an artificial intelligence model trained using a plurality of experts to ingest an image of an anatomical region and an associated contoured image of the anatomical region, and display a predicted contoured image; presenting for display, by the processor, a plurality of uniquely contoured images; receiving, by the processor, a selection of a uniquely contoured image; and transmitting, by the processor, the selection of the uniquely contoured image to a second processor.

The method may further comprise receiving, by the processor, a request for a custom contoured image, the custom contoured image based on one or more of the plurality of uniquely contoured images. The processor may generate the custom contoured image based on weighted portions of one or more selected experts of the plurality of experts.

The trained artificial intelligence model may comprise a common layer that is executed before at least one expert within the plurality of experts, the common layer configured to perform at least one of a group of: normalize at least a part of the image, scale the image, flatten the image, extract features from the image, and transform the dimensionality of the image. The common layer may learn via a supervised or unsupervised learning protocol.

Each expert of the trained artificial intelligence model may be trained using a supervised training protocol.

Each expert of the trained artificial intelligence model may correspond to a contouring preference.

Each expert of the trained artificial intelligence model may correspond to an end-user or a ground of end-users.

In another embodiment, a system may comprise a server comprising a processor and a non-transitory computer-readable medium containing instructions that when executed by the processor cause the processor to perform operations comprising: iteratively train an artificial intelligence model having a plurality of experts, where each expect is configured to predict a unique contoured image for an anatomical region depicted in an image in accordance with a preference attribute; select an expert from the plurality of experts based on a policy and an epsilon value indicative of a likelihood of an exploration action and an exploitation action, wherein when the epsilon value indicates the exploitation action, the processor selects the expert based on the expert corresponding to a minimum difference between a ground truth image and the predicted unique contoured image generated by the expert, wherein when the epsilon value indicates the exploration action, the processor randomly selects the expert, the randomly selected expert being an expert from the plurality of experts different from the expert corresponding to the minimum difference between the ground truth image and the predicted unique contoured image; and calculate a reward value indicative of a difference between the ground truth image and the predicted unique contoured image generated via the selected expert, wherein the processor iteratively trains the policy until the policy satisfies an accuracy threshold based on maximizing the reward.

The artificial intelligence model comprises a common layer that is executed before or after at least one expert within the plurality of experts, the common layer configured to perform at least one of a group of: normalize at least a part of the image, scale the image, flatten the image, extract features from the image, and transform the dimensionality of the image.

BRIEF DESCRIPTION OF THE DRAWINGS

Non-limiting embodiments of the present disclosure are described by way of example with reference to the accompanying figures, which are schematic and are not intended to be drawn to scale. Unless indicated as representing the background art, the figures represent aspects of the disclosure.

DETAILED DESCRIPTION

Figure 1A:
FIG. 1A illustrates an example of a medical image being segmented based on various medical professional image segmentation preferences, according to an embodiment.

Reference will now be made to the illustrative embodiments depicted in the drawings, and specific language will be used here to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one skilled in the relevant art and having possession of this disclosure, are to be considered within the scope of the subject matter disclosed herein. Other embodiments may be used and/or other changes may be made without departing from the spirit or scope of the present disclosure. The illustrative embodiments described in the detailed description are not meant to be limiting of the subject matter presented.

Clinics may utilize software solutions for radiation therapy treatment planning and performing various steps associated with treatment planning for patients. The software solutions may analyze patient data, clinical guidelines, clinical goals, and a multitude of other factors to generate a customized treatment plan for a patient. The customized treatment plan may include segmented (or contoured) medical images indicating one or more PTVs and/or OARs, prediction or preference of dose over voxel space, dosage gradients over contours over voxel space, and the like. The software solutions may include a set of computer-readable instructions stored on a non-transitory computer medium and configured to be executed by a processor to carry out this functionality.

Image segmentation preferences (or contouring guidelines) may vary per clinician. FIG. 1A is an example of a CT image 100a being segmented based on various medical professional image segmentation preferences. Four contours 102, 104, 106 and 108, dependent on contour preferences of various medical professionals, are drawn on the CT image 100a. Different medical professionals (or even the same medical professional at different times) may segment the image differently. For example, some medical professionals may segment the ribs while others may not. Further, the height of each of the contours in the CT image 100a (e.g., 102, 104, and 106) vary.

Although the example embodiment recites the use of image segmentation, the AI model may also learn other unknown preferences from the training set. Just as there are different approaches as to how to draw contours on an image, there are different ways to generate a dose distribution around those contours. The AI model learns the different preferences and uses the multi-expert scheme to distinguish between the schools of thought in treatment planning dose distributions so that the results of the AI model (the preferences of the medical professional presented for display in various selectable treatment planning images) can be customized to suit the dose-tradeoff preferences of the medical professional.

Figure 1B:
FIG. 1B illustrates an example of a medical image with preference contour of isodose levels based on various medical professional isodose level preferences, according to an embodiment.

For example, the dose over voxel space may become another preference learned through expert layers of the AI model. FIG. 1B is an example of a CT image 100b indicating isodose level preference contours of two medical professionals. One medical professional may have preferences indicated by preference 120 and another medical professional may have preferences indicated by preference 122. The learned preferences of the AI model suit the dose-tradeoff preferences of the medical professional. FIG. 1B shows isodose levels for one treatment plan different from another by preferences.

In addition to learning organ segmentation preferences over voxel space as shown in FIG. 1A, the AI model may learn any function over voxel space such as preference of dose over voxel space as shown in FIG. 1B. The flexible multi-expert AI model learns to distinguish preferences in treatment planning image segmentation preferences (e.g., FIG. 1A) and treatment planning dose distributions (e.g., FIG. 1B) such that the AI model can recreate customizable preferences on unknown images based on different preferences.

Preferences may also vary regionally. For example, physicians in Europe may be trained to segment the esophagus differently than in North America. Further, various clinics and/or institutions may have specific guideline requirements with respect to segmenting images.

Figure 2:
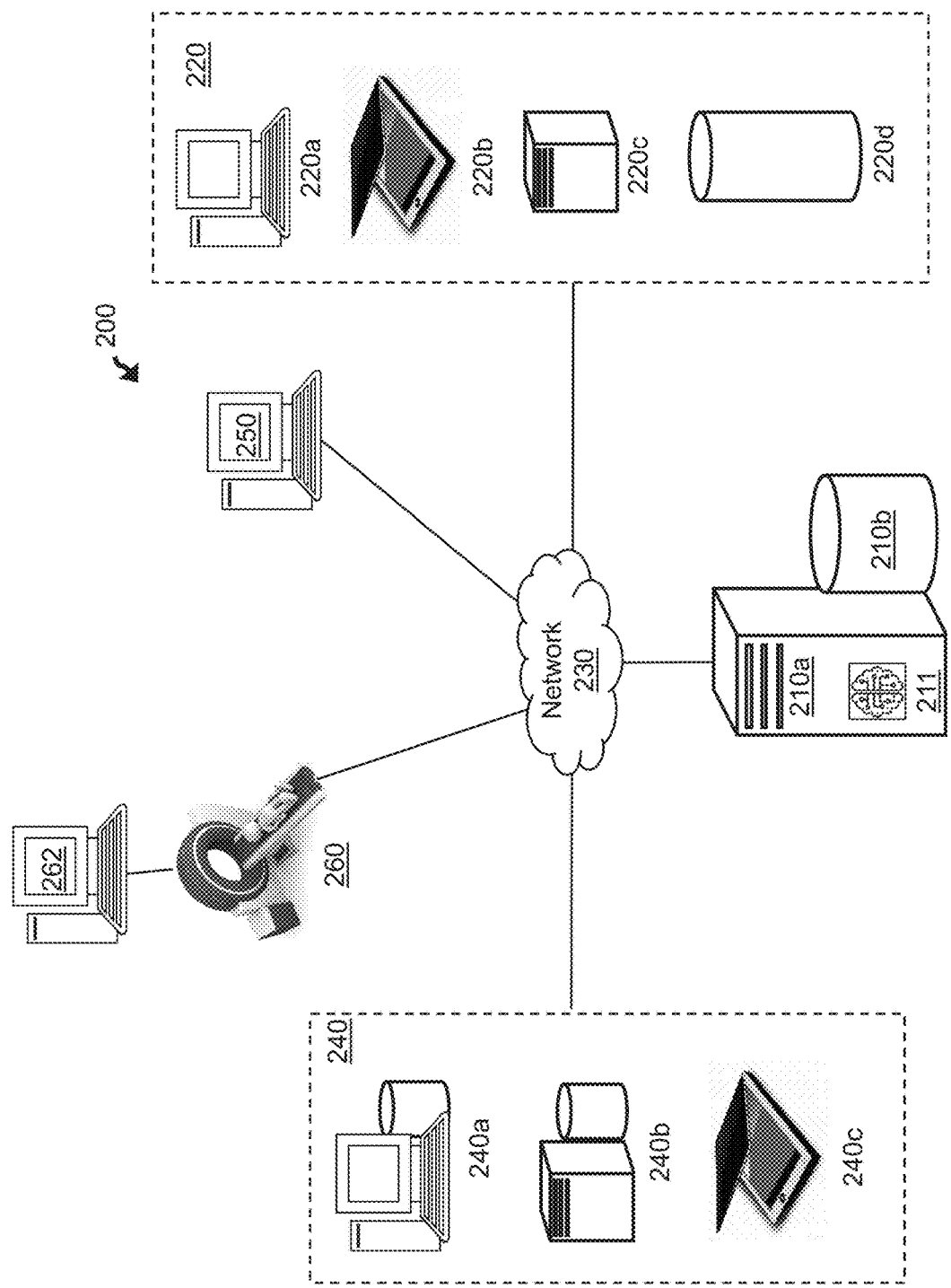
FIG. 2 illustrates components of an AI preference-aware image segmentation system, according to an embodiment.

As will be described below, a server (referred to herein as the analytics server) can train an AI model (e.g., neural network or other machine-learning model) using historical treatment data (e.g., medical images and segmented medical images) and/or patient data. In a non-limiting example, the analytics server may transfer, or a processor of a clinic may otherwise access, the trained AI model to a processor associated with the clinic for calibration and/or evaluation of treatment plans. FIG. 2 is an example of components of a system in which the analytics server operates. Various other system architectures that may include more or fewer features may utilize the methods described herein to achieve the results and outputs described herein. Therefore, the system depicted in FIG. 2 is a non-limiting example.

FIG. 2 illustrates components of an AI preference-aware image segmentation system 200, according to an embodiment. The system 200 may include an analytics server 210a, system database 210b, AI models 211, electronic data sources 220a-d (collectively electronic data sources 220), end-user devices 240a-c (collectively end-user devices 240), an administrator computing device 250, and a medical device 260 having a medical device computer 262. Various components depicted in FIG. 2 may belong to a radiotherapy clinic at which patients may receive radiotherapy treatment, in some cases via one or more radiotherapy machines located within the clinic (e.g., medical device 260). The above-mentioned components may be connected to each other through a network 230. Examples of the network 230 may include, but are not limited to, private or public LAN, WLAN, MAN, WAN, and the Internet. The network 230 may include wired and/or wireless communications according to one or more standards and/or via one or more transport mediums.

The system 200 is not confined to the components described herein and may include additional or other components, not shown for brevity, which are to be considered within the scope of the embodiments described herein.

The communication over the network 230 may be performed in accordance with various communication protocols such as Transmission Control Protocol and Internet Protocol (TCP/IP), User Datagram Protocol (UDP), and IEEE communication protocols. In one example, the network 230 may include wireless communications according to Bluetooth specification sets or another standard or proprietary wireless communication protocol. In another example, the network 230 may also include communications over a cellular network, including, e.g., a GSM (Global System for Mobile Communications), CDMA (Code Division Multiple Access), EDGE (Enhanced Data for Global Evolution) network.

The analytics server 210a may generate and display an electronic platform configured to use various computer models 211 (including artificial intelligence and/or machine learning models) to identify and display image segmentation preferences. For example, the platform may display various styles of image segmentation. The electronic platform may include a graphical user interface (GUI) displayed on each electronic data source 220, the end-user devices 240, the administrator computing device 250, and/or the medical device computer 262. An example of the electronic platform generated and hosted by the analytics server 210a may be a web-based application or a website configured to be displayed on different electronic devices, such as mobile devices, tablets, personal computer, and the like.

In a non-limiting example, a medical professional may input patient characteristics, clinical image segmentation guidelines, institutional image segmentation guidelines, personal preferences, anatomy characteristics, and the like to electronic data source 220b. The medical professional operating devices 220b, 240c, and 262, may access the platform, review displayed image segmentation preferences generated from the AI model 211, and select an image segmentation preference associated with segmenting an input medical image. In other embodiments, the medical professional accesses the platform, reviews displayed learned preferences associated with radiation dose reference or dose gradients, for example, and selects an image according to specific preferences. The medical professional selects the image based on preferences that may be regional, clinical/institutional, personal, particular patient, particular anatomy, and the like. The medical professional may use the medical professional device (e.g., medical professional device 240c) as both a device to display results predicted by the analytics server 210a and in some cases used as an electronic data source (e.g., electronic data source 220b) to train the AI models 211.

Operations invoked by the analytics server 210a to segment an image (or execute any function as part of a radiotherapy treatment) may be part of the operations in a sequence of operations to optimize a patient treatment plan. For example, image segmentation may be a one step in a sequence of steps used to determine a patient treatment plan (including determining an area to be radiated, a radiation dose, an angle of radiation, and the like).

The analytics server 210a may generate segmented images using a trained AI model to segment the image according to various image segmentation preferences. The segmented image may be used in other downstream applications (e.g., optimizing a treatment plan). Optimizing the treatment plan may include determining optimizing field geometry settings, radiation machine attributes, dosage administration attributes (e.g., dosage amount), treatment frequency, treatment timing, etc. The segmented images allows a medical professional to determine the proximity of any OAR to a PTV and/or evaluate the size, shape, and location of the PTV in the context of the patient's anatomy. The segmented image may further be used as a mask in subsequent downstream applications.

In particular, analytics server 210a may utilize the methods and systems described herein to automatically configure an AI model that learns preferences. In one embodiment, the analytics server 210a may display segmented medical images based on image segmentation preferences on an end-user device 240c, medical computing device 262, and/or medical professional device 220b. The medical professional may select a predetermined segmented medical image from the displayed segmented medical images using the end-user device 240c, medical computing device 262, and/or medical professional device 220b. Additionally or alternatively, the medical professional may customize a displayed image segmentation preference by combining (and/or weighting) the displayed image segmentation preferences and segmented medical images. The analytics server 210a may segment the image according to the customized image segmentation preference. The analytics server 210a may use the segmented image in one or more downstream applications during treatment planning. The analytics server 210a may also transmit the segmented image to one or more other servers.

The analytics server 210a may host a website accessible to users operating any of the electronic devices described herein (e.g., end users, medical professionals), where the content presented via the various webpages may be controlled based upon each particular user's role or viewing permissions. The analytics server 210a may be any computing device comprising a processor and non-transitory machine-readable storage capable of executing the various tasks and processes described herein. The analytics server 210a may employ various processors such as central processing units (CPU) and graphics processing unit (GPU), among others. Non-limiting examples of such computing devices may include workstation computers, laptop computers, server computers, and the like. While the system 200 includes a single analytics server 210a, the analytics server 210a may include any number of computing devices operating in a distributed computing environment, such as a cloud environment.

The analytics server 210a may execute software applications configured to display the electronic platform (e.g., host a website), which may generate and serve various webpages to each electronic data source 220 and/or end-user devices 240. Different users may use the website to view and/or interact with the image segmentation preferences The analytics server 210a may be configured to require user authentication based upon a set of user authorization credentials (e.g., username, password, biometrics, cryptographic certificate, and the like). The analytics server 210a may access the system database 210b configured to store user credentials, which the analytics server 210a may be configured to reference in order to determine whether a set of entered credentials (purportedly authenticating the user) match an appropriate set of credentials that identify and authenticate the user.

The analytics server 210a may also store data associated with each user operating one or more electronic data sources 220 and/or end-user devices 240. The analytics server 210a may use the data to weigh interactions while training various AI models 211 accordingly. For instance, the analytics server 210a may indicate that a user is a medical professional whose inputs may be monitored and used to train the machine-learning or other computer models 211 described herein.

The analytics server 210a may generate and host or present webpages that presents information based upon a particular user's role within the system 200. In such implementations, the user's role (e.g., medical professional, technician, nurse) may be defined by data fields and input fields in user records stored in the system database 210b. The analytics server 210a may authenticate the user and may identify the user's role by executing an access directory protocol (e.g., LDAP). The analytics server 210a may generate webpage content that is customized according to the user's role defined by the user record in the system database 210b.

The analytics server 210a may receive medical images from a medical professional or retrieve such data from a data repository, learn from the data, and display the image segmentation preferences and/or segmented medical image results on the electronic platform. For instance, in a non-limiting example, the analytics server 210a may query and retrieve medical images from the database 220d and combine the medical images with image segmentation preferences received from a medical professional operating the medical professional device 220b.

The analytics server 210a may also perform other preprocessing steps on the medical image captured from the medical device 260. The analytics server 210a may execute various AI models 211 (stored within the analytics server 210a or the system database 210b) to analyze and learn from the retrieved data. In an example embodiment, the analytics server 210a configures the AI model 211 to learn image segmentation preferences such that the AI model 211 is able to display various image segmentation preferences and/or segmented medical images associated with a retrieved medical image (e.g., from the medical device 160, a medical computing device 262, end-user device 240 and/or electronic data sources 220). The analytics server 210 displays the image segmentation preferences via the electronic platform on the administrator computing device 250, the medical professional device 220b, medical computing device 262, and/or the end-user devices 240.

The electronic data sources 220 may represent various electronic data sources that contain, retrieve, and/or input data associated with a patient's treatment plan including patient data and treatment data (e.g., medical images, manually segmented medical images). For instance, the analytics server 210a may use the clinic computer 220a, medical professional device 220b, server 220c (associated with a medical professional and/or clinic/institution), and database 220d (associated with the medical professional and/or the clinic/institution) to retrieve/receive medical images and/or manually segmented medical images.

End-user devices 240 may be any computing device comprising a processor and a non-transitory machine-readable storage medium capable of performing the various tasks and processes described herein. Non-limiting examples of an end-user device 240 may be a workstation computer, laptop computer, tablet computer, and server computer. In operation, various users may use end-user devices 240 to access the GUI operationally managed by the analytics server 210a. Specifically, the end-user devices 240 may include clinic computer 240a, clinic server 240b, and a medical professional device 240c. Even though referred to herein as "end user" devices, these devices may not always be operated by end users. For instance, the clinic server 240b may not be directly used by an end user. However, the results stored onto the clinic server 240b may be used to populate various GUIs accessed by an end user via the medical professional device 240c.

The administrator computing device 250 may represent a computing device operated by a system administrator. In one embodiment, the administrator computing device 250 may be configured to display and/or interact with image segmentation preferences and/or segmented medical images generated by the analytics server 210a (e.g., various preferences learned during training of one or more machine learning models and/or systems based on configuring the machine learning models during training); monitor various models 211 utilized by the analytics server 210a, electronic data sources 220, and/or end-user devices 240; review feedback; and/or facilitate training or retraining (calibration) of the AI models 211 that are maintained by the analytics server 210a.

The medical device 160 may be a radiotherapy machine (e.g., a linear accelerator, particle accelerator (including circular accelerators), or a cobalt machine)) configured to implement a patient's radiotherapy treatment. The medical device 160 may also include an imaging device capable of emitting radiation such that the medical device 160 may perform imaging according to various methods to accurately image the internal structure of a patient. For instance, the medical device 160 may include a rotating system (e.g., a static or rotating multi-view system). A non-limiting example of a multi-view system may include a stereo systems (e.g., two systems may be arranged orthogonally). The medical device 260 may also be in communication with a medical device computer 262 that is configured to display various GUIs discussed herein. For instance, the analytics server 210a may display the results predicted by the AI model 211 onto the medical device computer 262.

In an example operation, a medical professional may access an application executed on the medical professional device 220b and input patient data and the patient's treatment data (e.g., patient information, patient diagnosis, radiation therapy radiation requirements and thresholds). The analytics server 210a then uses a patient identifier to query patient data (e.g., patient anatomy and/or medical images) from the electronic data sources 220. The analytics server may then identify a clinic associated with the patient (e.g., clinic performing the treatment) and retrieve one or more files associated with treatment templates and clinic rules/guidelines. The analytics server 210a may then utilize the systems and methods described herein to configure an AI model 211 to learn image segmentation preferences for that clinic. Additionally or alternatively, the analytics serer 210 may execute a trained AI model 211 configured to automatically segment medical images according to learned image segmentation preferences. The analytics server 210a may execute the trained AI model 211 to display image segmentation preferences and/or segmented medical images. The analytics server 210 may receive a selected segmented medical image and transmit the selected segmented medical image to one or more downstream applications. A downstream application may, for example, employ additional AI models 211 to optimize a treatment plan based on the selected segmented medical image.

The analytics server 210a may be in communication (real-time or near real-time) with the medical device computing device 262, end-user device 240 and/or electronic data sources 220, such that a server/computer hosting the medical device 260 can adjust the medical device 260 based on the segmented image and subsequently determined treatment plan. For instance, the radiotherapy machine may adjust the gantry, beam blocking device (e.g. multi leaf collimator MLC), and couch based on beam angles, field geometry settings, dose distribution, and other radiotherapy parameters in response to a treatment plan based on the segmented image.

The analytics server 210a may store AI models 211 (e.g., neural networks or other deep learning models), that are trained to learn preferences. For example, the analytics server 210a may store AI models 211 trained to learn image segmentation preferences and segment images according to the image segmentation preferences (e.g., regional image segmentation preferences, clinical/institutional image segmentation preferences, medical professional specific image segmentation preferences, anatomy specific image segmentation preferences, patient characteristics, and the like). The analytics server 210a may train the AI models 211 using segmented images (e.g. historical manually segmented images, images segmented for purposes of training the AI models 211) such that the AI models 211 are able to learn image segmentation preferences and apply image segmentation preferences on unknown medical images (e.g., at inference time for a patient treatment plan).

AI models 211 may be stored in the system database 210b and may correspond to individual radiotherapy clinics or otherwise different sets of radiotherapy machines (e.g., radiotherapy machines that are located at individual radiotherapy clinics, are located in different geographical regions, treat specific types of diseases (e.g., different types of cancer), treat specific genders, etc.). For example, the AI model 211 may be associated with an identifier indicating the radiotherapy clinic, set of radiotherapy machines, specific types of patients (e.g., pediatric, geriatric) or specific diseases. Additionally or alternatively, the same AI model 211 may be executed for multiple clinics, adjusting one or more portions of the AI model 211 (e.g., experts, as discussed herein) such that the AI model 211 segments medical images according to the image segmentation preferences of the multiple clinics.

In various embodiments, AI models 211 use one or more deep learning engines to learn preferences of medical image data for radiotherapy treatment planning. Although exemplified using deep convolutional neural networks, it should be understood that any alternative and/or additional deep learning model(s) may be used to implement deep learning engines. The deep learning engines include processing pathways that are trained during training phase. Once trained, deep learning engines may be used (e.g., by a medical professional) to select a preference associated with an input medical image during inference phase.

One type of deep learning engine is a convolutional neural network (CNN). A CNN is a branch of neural networks and consists of a stack of layers each performing a specific operation, e.g., convolution, pooling, loss calculation, etc. Each intermediate layer receives the output of the previous layer as its input. The beginning layer is an input layer, which is directly connected to an input image and may have a number of neurons equal to the number of pixels in the input image. The next set of layers are convolutional layers that present the results of convolving a certain number of filters with the input data and perform as a feature extractor. The filters, commonly known as kernels, are of arbitrary sizes defined by designers depending on the kernel size. Each neuron responds only to a specific area of the previous layer, called receptive field. The output of each convolution layer is considered as an activation map, which highlights the effect of applying a specific filter on the input. Convolutional layers may be followed by activation layers to apply non-linearity to the activation maps. The next layer can be a pooling layer that helps to reduce the dimensionality of the convolutional layer's output. In various implementations, high-level abstractions are extracted by fully connected layers. The weights of neural connections and the kernels may be continuously optimized in the training phase.

Deep learning generally uses models to learn categories incrementally, e.g., learning lower-level categories before attempting to learn higher level categories. For example, a computer can be provided with a large dataset and, by using deep learning algorithms, can sort elements of the data into categories such as function, shape, etc. A "clustering" may occur based on similarity of data.

The aim of training phase is to train deep learning engines to learn preferences by mapping input data (medical image data) to ground truth data (corresponding medical image data with preferences). Training phase may involve finding weights that minimize the training error between training preferences and estimated preferences generated by the deep learning engine.

In an example, during training phase, the deep learning engine may be trained using suitable training data related to image segmentation preferences based on regional preferences, medical professional preferences, clinic/institution preferences, patient anatomy preferences, and the like. In practice training data may include unsegmented medical image data for patients (e.g., medical images of patient OARs and PTVs), and segmented image data as output data. Image data may include 2D or 3D images of the patient's anatomy, which may be captured via any suitable imaging modality or modalities. A 3D volume of the patient that will be subjected to radiation is known as a treatment volume, which may be divided into multiple smaller volume-pixels (voxels).

In practice, training data may be user-generated (e.g., by a medical professional) through observations and experience to facilitate supervised learning. For example, training data may be extracted from past treatment plans developed for prior patients. Training data may be pre-processed via any suitable data augmentation approach (e.g., rotation, flipping, translation, scaling, noise addition, cropping, any combination thereof, etc.) to produce a new dataset with modified properties to improve model generalization using ground truth.

A medical professional may access an end-user device 240 located at the clinic or access an account associated with the clinic. The medical professional may provide an input at a user interface that causes the end user device 240 to transmit a request to access an AI model 211 that is associated with the clinic and/or the radiotherapy machines located within the clinic. The request may include an identifier associated with the AI model 211, the clinic, and/or the set of radiotherapy machines that the analytics server 210a may use as a key in a look-up table to identify the AI model 211. The analytics server 210a may receive the request and, in some cases, after authenticating the medical professional, identify the AI model 211 via the identifier. The analytics server 210a may transmit the identified AI model 211 to the end-user device 240 or send an alert indicating the end-user device is authorized to access the model(s) 211. Upon receipt or access to the AI model 211, the end user device 240 may perform the systems and methods described herein to train or retrain the AI model 211 to learn preferences and/or display various customized medical images to a clinician based on a received medical image and the learned preferences of the AI model 211. Additionally, or alternatively, the end-user device 240 may perform the systems and methods described herein to select a medical image and associated preference generated by the AI model.

Figure 3:
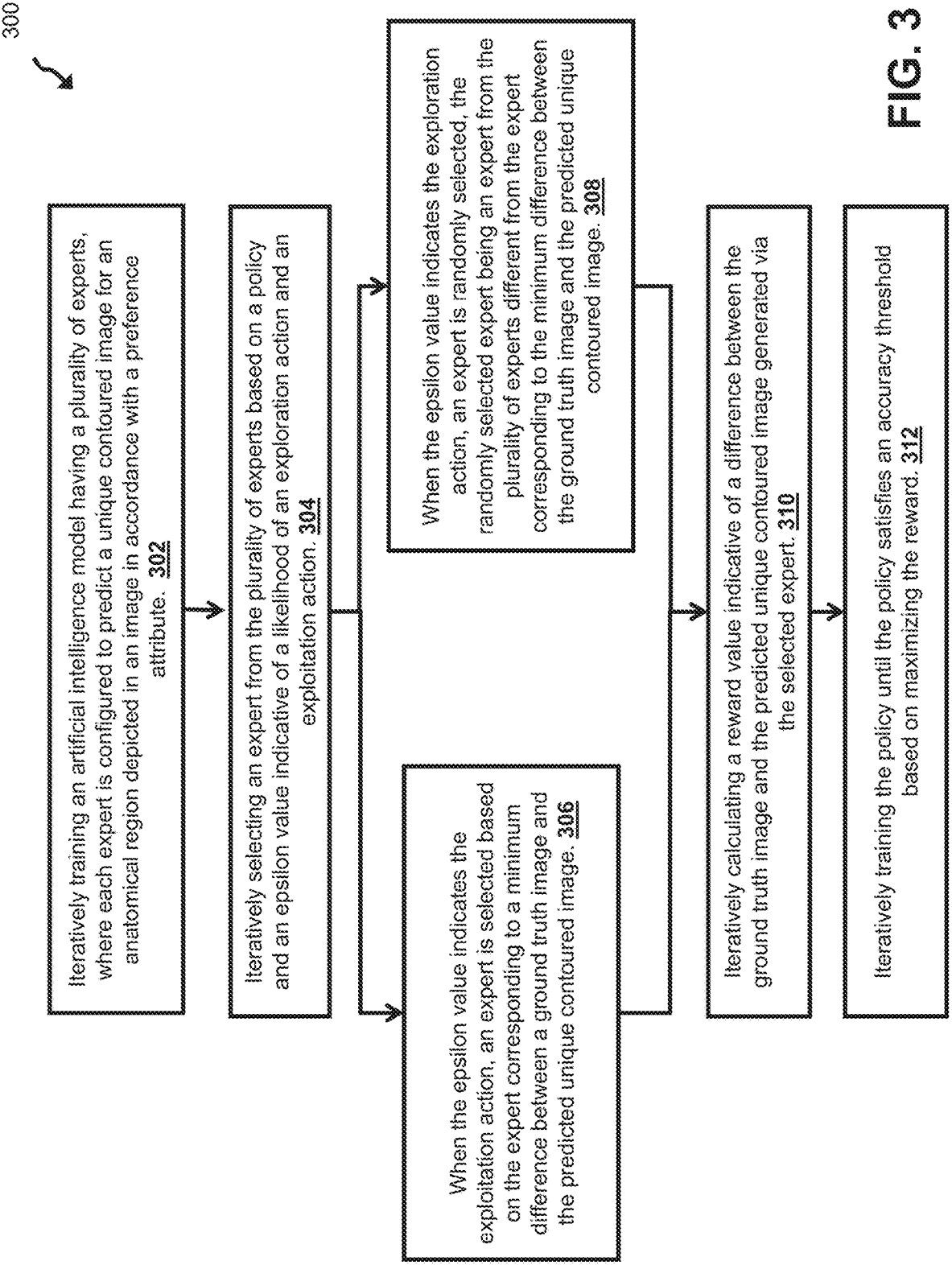
FIG. 3 illustrates a flow diagram of an AI preference-aware image segmentation system, according to an embodiment.

FIG. 3 illustrates a flow diagram of an AI preference-aware image segmentation system, according to an embodiment. The method 300 includes steps for training an AI model, according to an embodiment. The method 300 may include steps 302-312. However, other embodiments may include additional or alternative steps, or may omit one or more steps altogether.

The method 300 is described as being executed by an analytics server, such as the analytics server described in FIG. 2. The analytics server may employ one or more CPUs and GPUs to perform one or more steps of method 300. The CPUs and/or GPUs may be performed in part by the analytics server and in part by one or more other servers and/or computing devices. The servers and/or computing devices employing the CPUs and GPUs may be local and/or remote (or some combination). For example, one or more virtual machines in a cloud may employ one or more CPUs and GPUs to perform one or more steps of method 300. A hybrid CPU and GPU implementation may improve the speed associated with training a machine learning model to learn preferences. However, one or more steps of method 300 may be executed by any number of computing devices operating in the distributed computing system described in FIG. 2. For instance, one or more computing devices may locally perform part or all of the steps described in FIG. 3. Moreover, an "agent," referring to the learner or the trainer (e.g., the analytics server training the machine learning model or the machine learning model itself), may perform one or more steps discussed herein.

In step 302, the analytics server iteratively trains an AI model (e.g., AI model 211 in FIG. 2) having a plurality of experts. The AI model learns multiple experts from data such that each expert operates on a medical image uniquely. The trained experts are applied to real world datasets for which there is no real ground truth and relied upon to determine what to do (e.g., how to uniquely segment the medical image based on the learned preferences of a particular medical professional). For example, each expert in the AI model may be configured to predict a segmented image for an anatomical region depicted in an image, where the image is segmented in accordance with a preference attribute (or image segmentation preference, image segmentation style, preference style, etc.).

The analytics server may train the AI model using an input image and a segmented version of the input image. The input image depicts an anatomical region of a patient and the segmented version of the input image uses contours (or segments) to delineate an anatomical region of the patient. The analytics server may receive the input image and segmented version of the input image from one or more databases.

Figure 4:
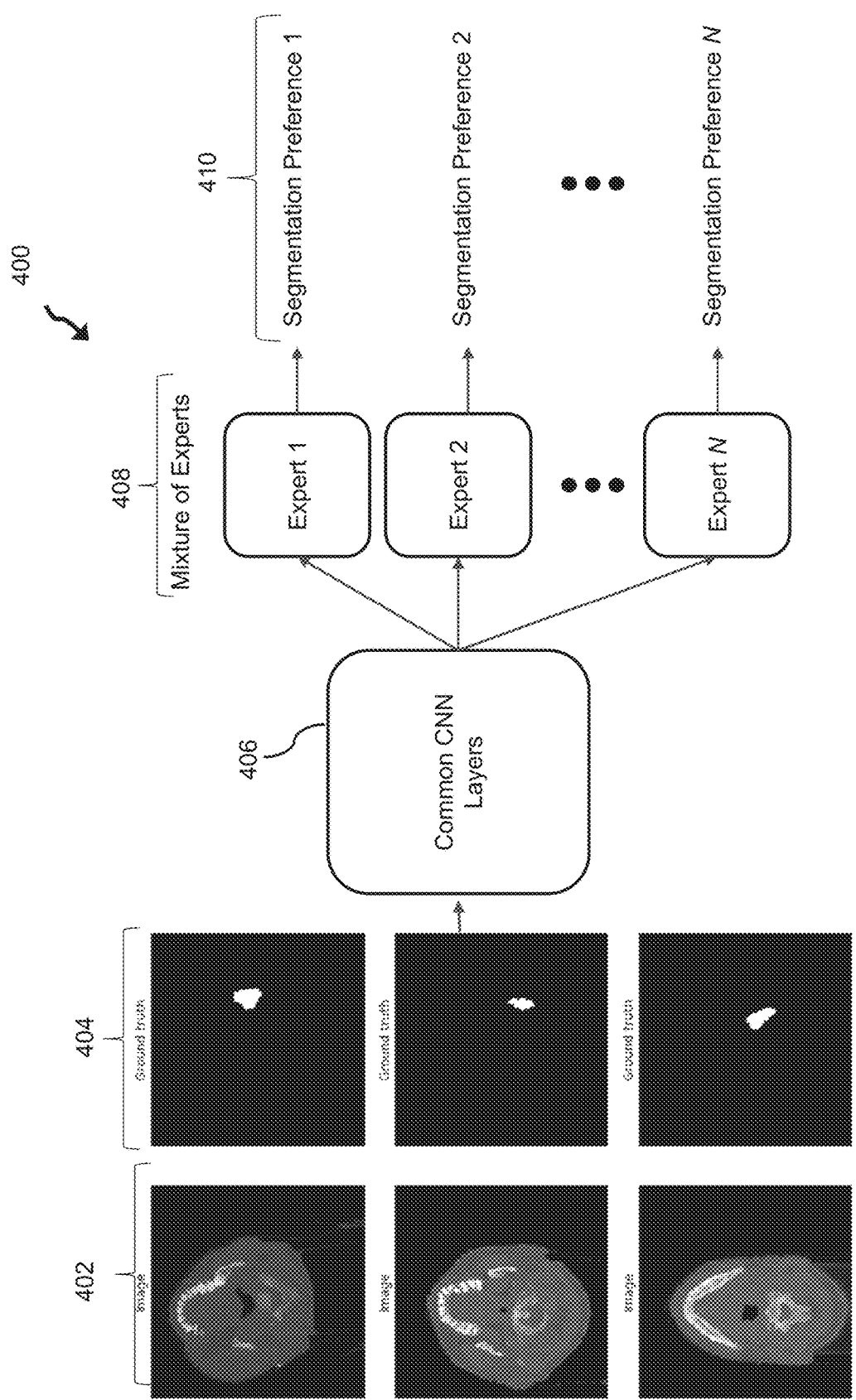
FIG. 4 illustrates an AI model training system, according to an embodiment.

FIG. 4 illustrates an AI model 400 training system, according to an embodiment. The inputs into the AI model 400 include medical images 402 (e.g., CT images) and ground truth images 404. The medical images 402 may be a 2D slice of the original 3D CT image. The ground truth image 404 may be an image indicating one or more preferences. For example, the ground truth image may be a segmented version of the medical image 402. A medical professional may segment the medical image 402 to produce the ground truth image 404. The AI model 400 will learn to predict the segmented style (e.g., a segmentation preference) using the ground truth images 404 and associated medical images 402 such that the AI model 400 outputs an image similar to the ground truth image 404. The AI model 400 may include common layers 406 and experts 408 (e.g., a mixture of experts). Each expert 408 outputs a unique segmentation preference 410.

The AI model 400 may include both an expanding path and a contracting path. The common layers 406 may perform some or all of the operations of the contracting path (e.g., applying a convolutional layer to an image, applying a max pooling layer). The experts 408 may be placed in at least one or several layers within the expanding path. Accordingly, the expanding path may be considered to have various sub-paths. In some configurations, each sub-path may be merged back together. As discussed herein, the placement of the expert layers in the AI model 400 is flexible. In some arrangements, experts 408 may be placed in the last layer of the expanding path. Placing the experts 408 in the expanding path allows each expert to decode the feature map differently, while also allowing the features of the input medical image 402 to be learned by the AI model 400 in the contracting path.

Figure 5A:
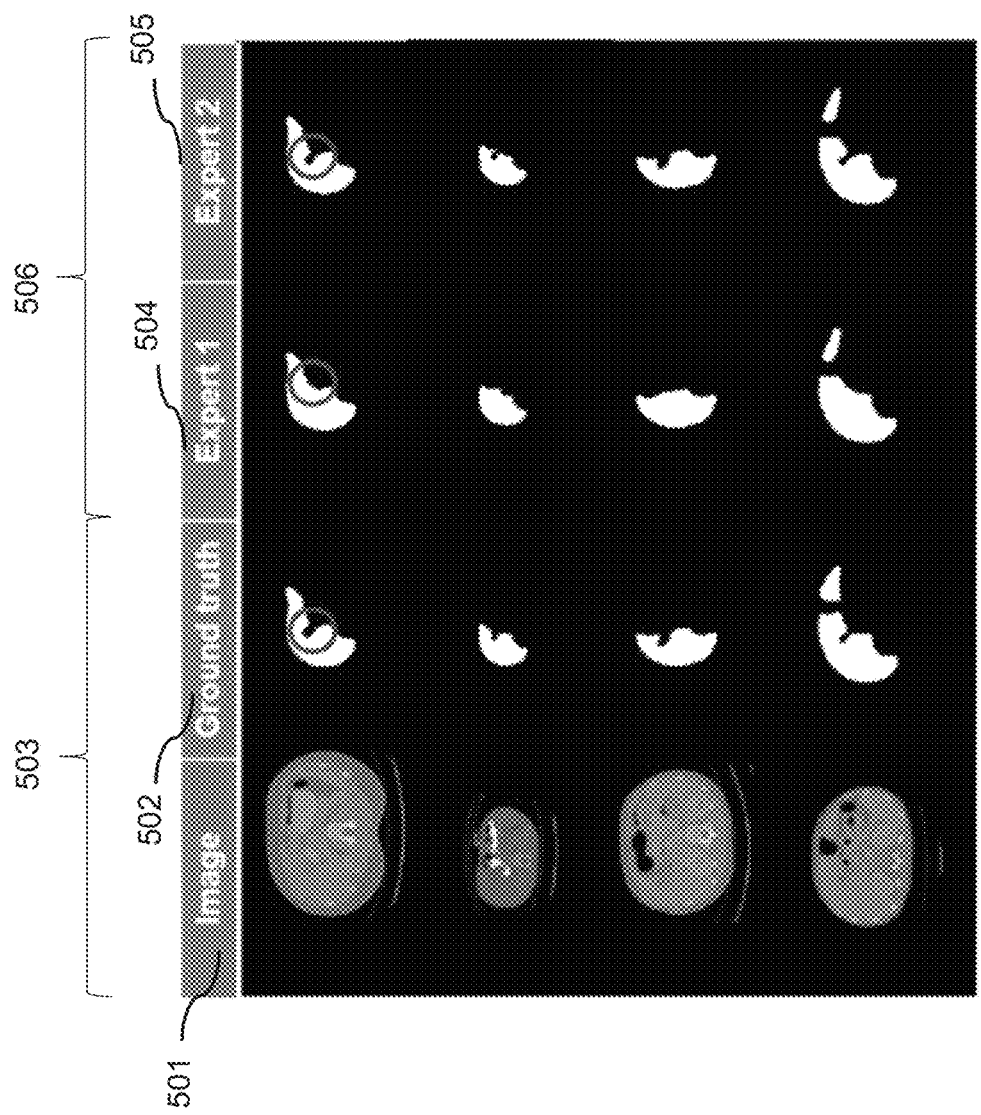
FIG. 5A illustrates inputs/outputs of an AI model trained to perform image segmentation, according to an embodiment.

FIG. 5A illustrates inputs/outputs of an AI model trained to perform image segmentation, according to an embodiment. Inputs 503 include both the medical images 501 and ground truth images 502. As shown, the medical images 501 are of the abdomen. The medical images 501 may be a 2D slice of the original 3D CT image. Outputs 506 of the AI model include an output for each expert. The output 504 associated with the first expert is a segmentation preference of the medical image 501 of a liver segmented with the gall bladder. The output 505 associated with the second expert is a segmentation preference of the medical image 501 of the liver segmented without the gall bladder. As shown, each expert outputs a unique image segmentation preference associated with the image 501. The output 505 is closer to the segmentation preference associated with the ground truth 502. However, the AI model may have received other medical images during training such that expert 1 became specialized to segment the input medical image with the gall bladder. As discussed herein, the various image segmentation preferences (e.g., output 504 associated with segmenting the liver with the gall bladder and output 505 associated with segmenting the liver without the gall bladder) do not have to be present in equal quantities in the training set for the experts to learn the unique image segmentation preferences.

Figure 5B:
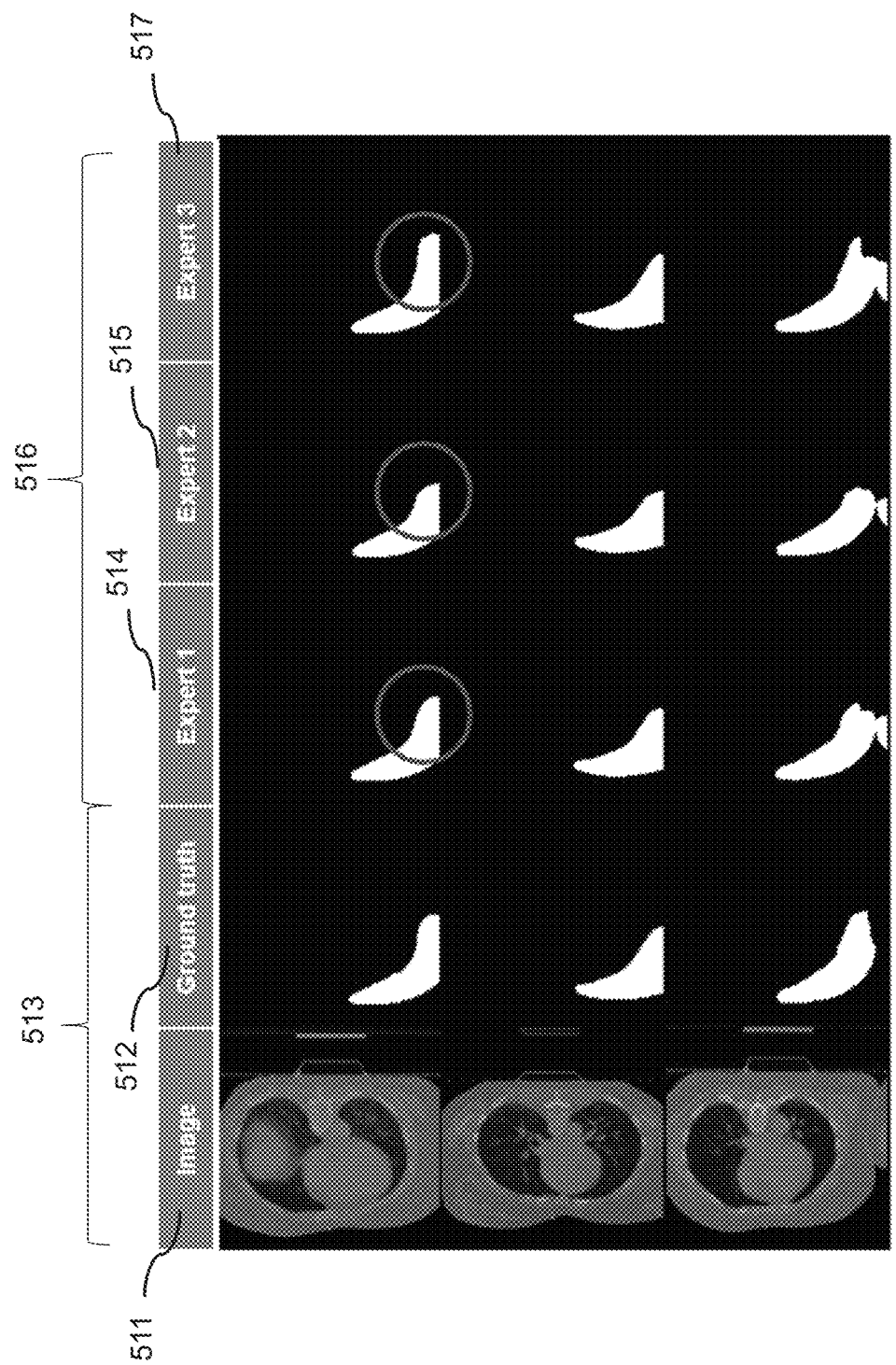
FIG. 5B illustrates inputs/outputs of the AI model trained to perform image segmentation, according to an embodiment.

FIG. 5B illustrates inputs/outputs of the AI model trained to perform image segmentation, according to another embodiment. Inputs 513 include both the medical images 511 and ground truth images 512. As shown, the medical images 511 are of breasts. Associated with each medical image 511 is a ground truth image 512. Outputs 516 of the AI model include an output for each expert. As shown, three experts have specialized in unique image segmentation preferences. Each of the experts output an image with a unique segmentation preference (e.g., output 514, output 515, and output 517). Each of the outputs (e.g., output 514, output 515, and output 517) indicate varying posterior lengths of the left breast contour.

Referring back to FIG. 3, in some embodiments, the analytics server may receive a 3D model (or image) and associated contoured version of the 3D model from a database (e.g., database 210b in FIG. 2). The analytics server may feed the 3D images directly into the AI model if the AI model is configured to accept 3D images. For example, various neural networks such as the PointNet neural network may accept 3D images. Additionally, or alternatively, the analytics server may transform the 3D images into a 2D images using any suitable method of 2D construction such as forward projecting the 3D voxels into 2D pixels.

In other embodiments, the analytics server may receive a 2D image and an associated contoured version of the 2D image from a database (e.g., database 210b in FIG. 2). The analytics server may feed the 2D images directly into the AI model if the AI model is configured to accept 2D images. Additionally, or alternatively, the analytics server may transform the 2D images into a 3D images using any suitable method of 3D reconstruction such as the Feldkamp-Davis-Kress (FDK) algorithm.

Figure 6A:
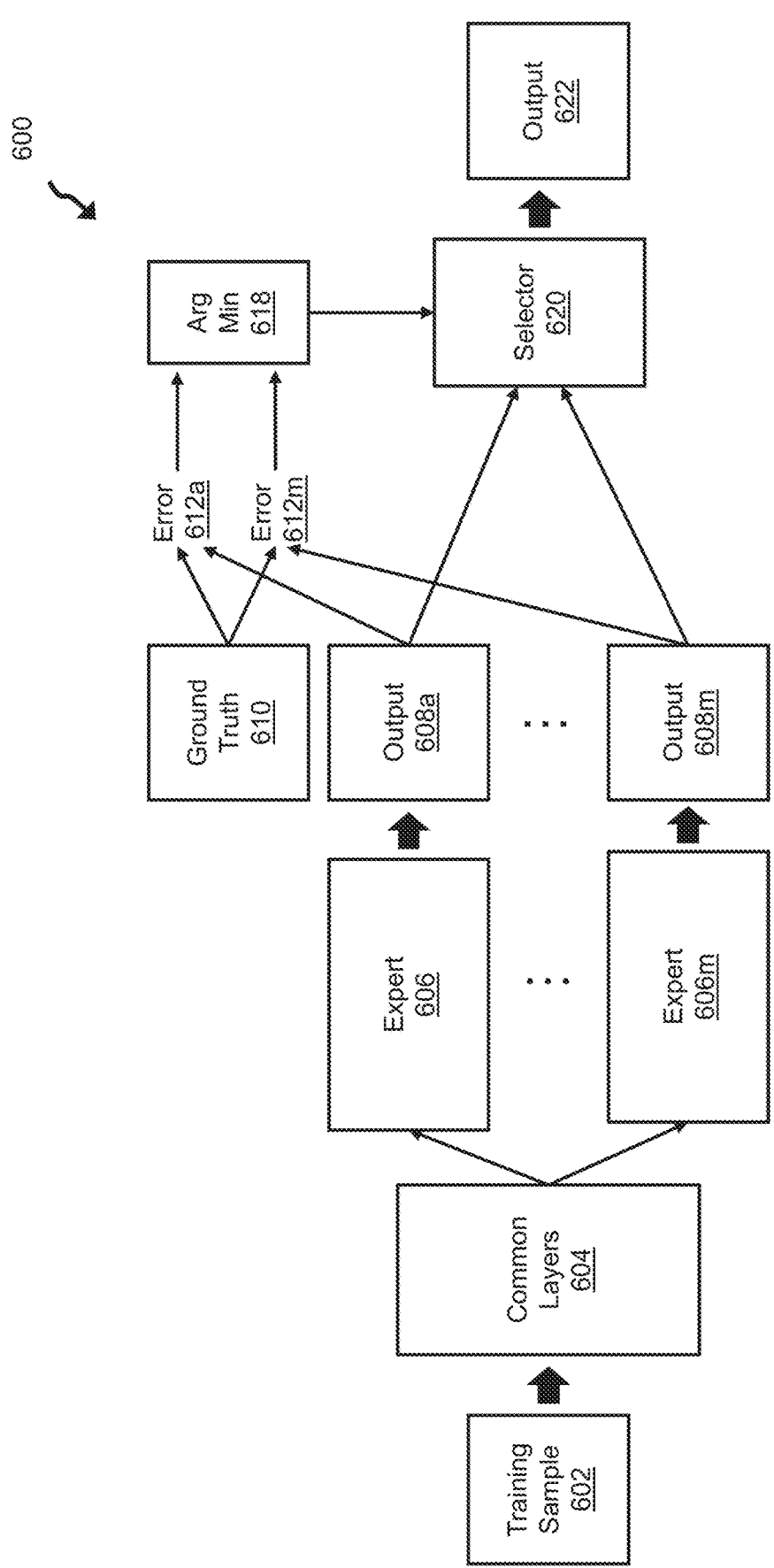
FIG. 6A illustrates a workflow of training an AI model to become preference aware, according to an embodiment.

FIG. 6A illustrates a non-limiting example of a workflow of training an AI model 600 to become preference aware. The AI model 600 may be trained on data that is less curated than for traditional training. Preferences do not have to be specified as they are learned by the AI model 600. As discussed further herein, the AI model 600 may be a deep convolutional neural network with multiple experts, each specializing to segment a different preference. For example each expert specializes to a different segmentation (or contouring) preference, and produces a uniquely segmented preference-aware image.

A first characteristic of the AI model 600 includes placing the experts anywhere in the architecture of the AI model 600. Each expert may have its own architecture, but the experts may share the same inputs. The location of the experts in the network may vary. A second characteristic of the AI model 600 includes using reinforcement learning (or any suitable active learning method) to select experts to train. During training, the weights of the AI model 600 may be adjusted using an adapted backpropagation algorithm. An exploration-exploitation tradeoff is employed to ensure that all experts get specialized. A third characteristic of the AI model 600 is customizing the learned preferences. Customizing the learned preferences are discussed with reference to FIG. 14.

Other AI models may employ gated mixture of experts (MOE) models (e.g., models used for natural language processing applications). However, MOE models are conventionally single input-single output, where the input to the MOE drives the selection of the expert. In some embodiments, the top K experts are softmaxed using coefficients from the gating network for expert selection.

In contrast, AI model 600 is a single input—multiple output model. The output drives the selection of the expert such that there is no gating after the experts. In some embodiments, the top K experts are evaluated as to whether backpropagation is executed over the k experts. Each expert produces a different segmentation output.

Referring still to FIG. 6A, the analytics server provides a training sample 602 to common layers 604 of the AI model 600. As shown, the common layers 604 occur before the experts 606. The training sample 602 may be a 2D or 3D image of an anatomical region of a patient with at least one PTV and/or OAR. In some embodiments, the training sample 602 may be transformed (before the common layer 604 and/or as part of the common layers 604) into a different dimension (e.g., from 3D to 2D or from 2D to 3D) using any suitable method.

Figure 6B:
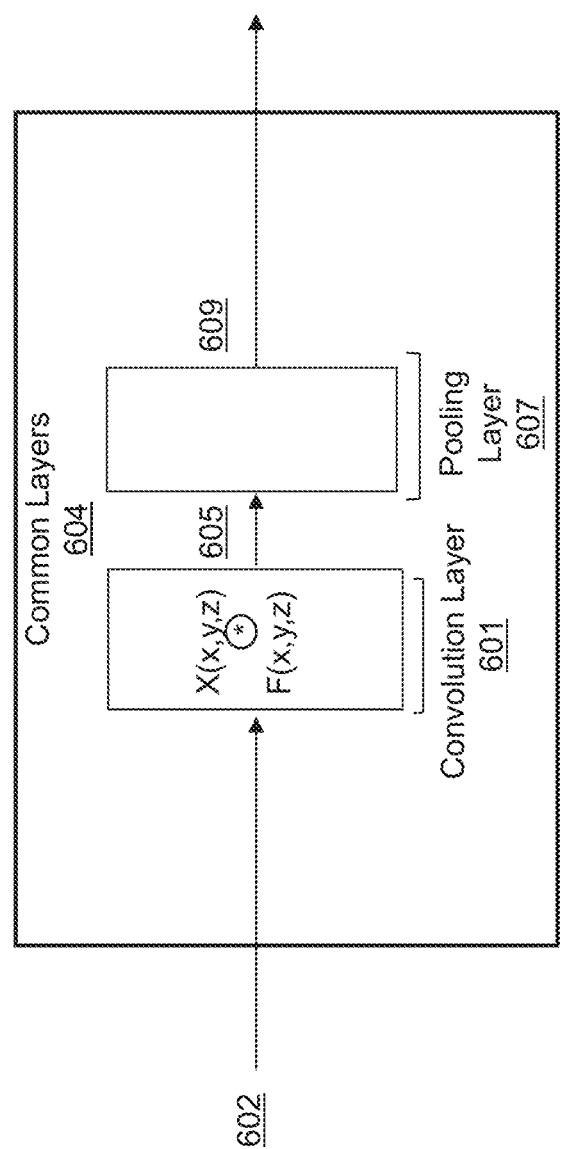
FIG. 6B illustrates common layers employed in the AI model, according to an embodiment.

The common layers 604 may receive the training sample 602. FIG. 6B illustrates common layers employed in the AI model 600, according to an embodiment. As shown, common layer 604 may include at least a convolutional layer 601 and a pooling layer 607. The common layers may learn via any supervised or unsupervised learning protocol.

The convolutional layer 601 may receive the training sample 602 (or a pre-processed version of the training sample). For example, pre-processing the training sample 602 may include the analytics server normalizing the training sample 602, scaling the training sample 602, flattening the training sample 602, normalizing the training sample 602, transforming the training sample 602 into a different dimension, and the like. Additionally, or alternatively, the common layers 602 may be configured to pre-process the training sample 602.

The convolutional layer 602 detects and extracts features of the training sample 602 by convolving a filter and/or kernel with the training sample 602 and generating a feature map of the extracted features. Convolving the training sample 602 with the filter has the effect of reducing the dimensions of the training sample 602.

The output of the convolutional layer 601 may be a feature map 605. In some embodiments, there may be one or more convolutional layers after convolutional layer 601. Increasing the number of convolutional layers increases the complexity of the features detected in the feature map. If additional convolutional layers are employed, the filters in the subsequent convolutional layers may be the same as the filters employed in the first convolutional layer 601. Additionally, or alternatively, the filters used in the subsequent convolutional layers may be different from the filters employed in the first convolutional layer 601.

The feature map 605 may be fed into a pooling layer 607. The pooling layer 607 may be a max pooling layer (or any other type of pooling later) that detects prominent features. In other configurations, the pooling layer 607 may be an average pooling layer. The pooling layer 607 reduces the dimensionality of the feature map 607 to down sample the feature map for more efficient operation. In an example, if the pooling layer 607 is a max pooling layer, then the analytics server detects the prominent features having higher relative values in a pooling window comprising a set of values that is a predetermined length and/or duration.

In some embodiments, a convolutional layer may succeed the pooling layer to re-process the down-sampled data and highlight features in a new feature map. In other embodiments, additional pooling layers may be employed by the AI model 600. The additional pooling layers may apply the same or a different type of pooling layer as the first pooling layer 607. In some embodiments, the down-sampled feature map 609 may be flattened before being input into the expert layers 606. Performing a flattening operation includes the analytics server arranging the down-sampled feature map 609 (represented as an array) into one-dimensional vectors, thereby easing the computational burdens of the analytics server executing the AI model 600.

Referring back to FIG. 6A, the analytics server feeds the output of the common layers 604 into expert layers 606. The common layers 604 benefit each of the expert layers 306a and 306m (collectively referred to as expert layers 606) by reducing the computation time. However, in some embodiments, the analytics server feeds the training sample 602 directly into expert layers 606 (e.g., the AI model 600 may not employ common layers 604).

Figure 6C:
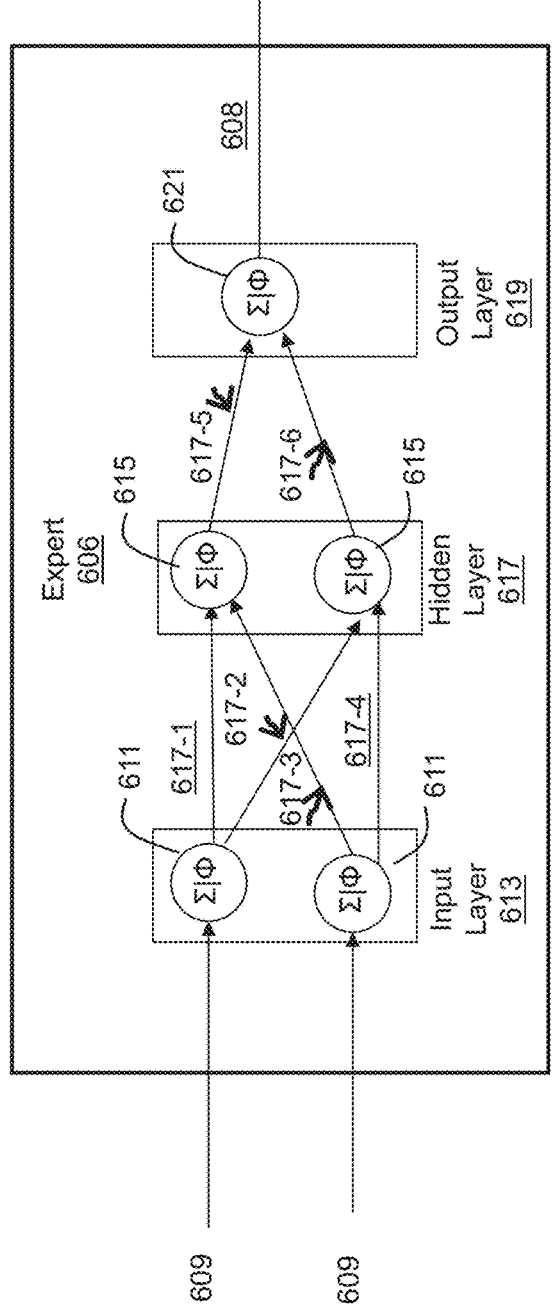
FIG. 6C illustrates expert layers employed in the AI model, according to an embodiment.

FIG. 6C illustrates expert layers employed in the AI model 600, according to an embodiment. As shown, expert layer 606 may be a fully connected layer. The expert layer 606 may ingest the down-sampled feature map 609 from the common layers 604 using an input layer 613 and one or more hidden layers 617. In other embodiments, the expert layer 606 may not include any hidden layers 617.

The input layer 613 includes neurons 611 connecting to each of the neurons 615 in the hidden layer 617. The neurons 615 in the hidden layer 617 connect to neuron 621 in the output layer 619. The output layer 619 generates a segmented image 608 based on the particular expert. The AI model 600 may include a number of hidden layers 617 between the input layer 613 and the output layer 619.

Generally, nodes (611, 615, 621) perform particular computations and are interconnected to nodes of adjacent layers. Each of the neurons 611, 615 and 621 sum the values from the adjacent nodes and apply an activation function, allowing the expert 606 to learn a particular image segmentation preference such that the expert outputs 608 a segmented medical image based on the image segmentation preference.

Each of the neurons 611, 615 and 621 are interconnected by algorithmic weights 617-1, 617-2, 617-3, 617-4, 617-5, 617-6 (collectively referred to as weights 617). Weights 617 are tuned during training to adjust the strength of the neurons. For example, the adjustment of the strength of the neuron facilitates the expert's ability to segment medical images according to a particular image segmentation preference and generate an accurate output 608. The analytics server optimizes the algorithmic weights during training such that the expert layer 606 becomes specialized with respect to a particular preference. The expert layer 606 is trained to learn the relationship of the preference according to the features extracted from the common layers 604.

Referring back to FIG. 6A, the expert 606a may produce output 608a and expert 606m may produce output 608m (collectively referred to as outputs 608). The outputs 608 may be uniquely segmented versions of the training sample 602. At the time of training, there is no association between experts 606 and preference (e.g., image segmentation preference). That is, the experts 606 become specialized with respect to unique image segmentation preference attributes during training.

Unlike conventional approaches, which may train experts based on associating experts with medical professionals, the systems and methods described herein associate experts and preferences during training. For example, conventional approaches may assume that each medical professional is associated with one image segmentation preference. Accordingly, gated networks or other suitable means of identifying medical professionals may be performed at the beginning of the artificial intelligence model such that an appropriate expert is trained based on the medical professional associated with a training sample.

In contrast, the experts 606 in the systems and methods disclosed herein may be trained to specialize in image segmentation preferences using, for example, a highly flexible and unsupervised AI architecture. Each expert 306 is specialized to a particular style of segment without any indication of the number of image segmentation preferences, medical professionals, institutions, clinics, guidelines, and the like. Accordingly, any suitable evolutionary algorithm may optimize a number of experts in the AI model 600 by growing and/or discarding experts 606 as the AI model 600 trains.

The analytics server may evaluate the outputs 608 using various criteria to determine the best expert and associated output for the ground truth 610. For example, the analytics server may compare each of the outputs 608 to the ground truth 610, where the ground truth 610 is the segmented training sample 602 according to one or more particular image segmentation (or contour) styles (or preferences). The analytics server may evaluate an error (or difference) between the ground truth 610 and the outputs 608. For example, error 612a corresponds to difference between the ground truth 610 and the output 608a. Similarly, error 612m corresponds to the difference between the ground truth 610 and the output 608m. The analytics server may evaluate the error 612 (referring to the both error 612a and/or error 612m) based on a loss function (e.g., root mean square error, square error function, absolute error function) or other metric. The analytics server determines the smallest error using, for example, the argmin operation 618.

The expert 606 associated with the output 608 resulting in the smallest error 612 (determined by the argmin operation 618) indicates that the particular expert was better configured to segment the training sample 602 according to the ground truth 610 image segmentation preference. As opposed to selecting an expert to segment a training sample 602 based on input information (e.g., a medical professional labeling a training sample), the output 608 drives the analytics server to select an expert 606 to be trained. However, in some embodiments, the analytics server may use input information (such as end-user and/or group of end-user information) to select an expert 606 to train.

The analytics server may select a winner expert (e.g., expert 606a or expert 606m) to train based on the output of the argmin operation 618. The selected expert is trained using supervised training protocols. The expert 606 associated with the minimum output error 608 (e.g., the expert 606 producing the output 608 closest to the ground truth 610) is selected as the winner and that expert 606 is trained.

The analytics server trains the winner expert by propagating the error 612 associated with the winner expert through the expert. For example, the analytics server propagates error 612a if expert 606 is selected as the winner expert and error 612m if expert 606b is selected as the winner expert. The error 612 is propagated through the algorithmic weights in the winner expert and/or common layers 604 such that the strength of each of the weights connecting the neurons in the winner expert and/or common layers 604 is adjusted. For example, if the loss function used to determine the error 612 is continuously differentiable, the analytics server may optimize the algorithmic weights connecting each of the neurons using the steepest descent method.

In some embodiments, the top K number of experts are trained based on the outputs closest to the ground truth. The analytics server may determine that an output 608 is close to the ground truth 610 for example, if the error 612 associated with the output 608 and ground truth 610 is within a predetermined threshold.

During early stages of training, experts 606 may produce random outputs based on randomly initialized variables. As training progresses, the experts 606 start specializing toward specific preferences. Accordingly, experts 606 becomes specialized with respect to unique preferences over time.

The analytics server may train experts 606 with respect to preferences present in ground truth images 610. For example, a user (such as a medical professional) segmenting an image for the ground truth image 610 may segment the image based on an attribute of a patient (e.g., included as patient metadata to the AI model 600). For instance, an image of a patient with one kidney may be segmented differently from an image of a patient with two kidneys. Similarly, an image of a geriatric patient may be segmented differently from an image of a pediatric patient.

Because of the randomness associated with early training, one expert (e.g., expert 606a or expert 606b) may learn \ preferences without allowing the other experts the opportunity to train. Therefore, the analytics server may select experts 606 to train using reinforcement learning or any active learning method to prevent only one expert from becoming trained.

Figure 7:
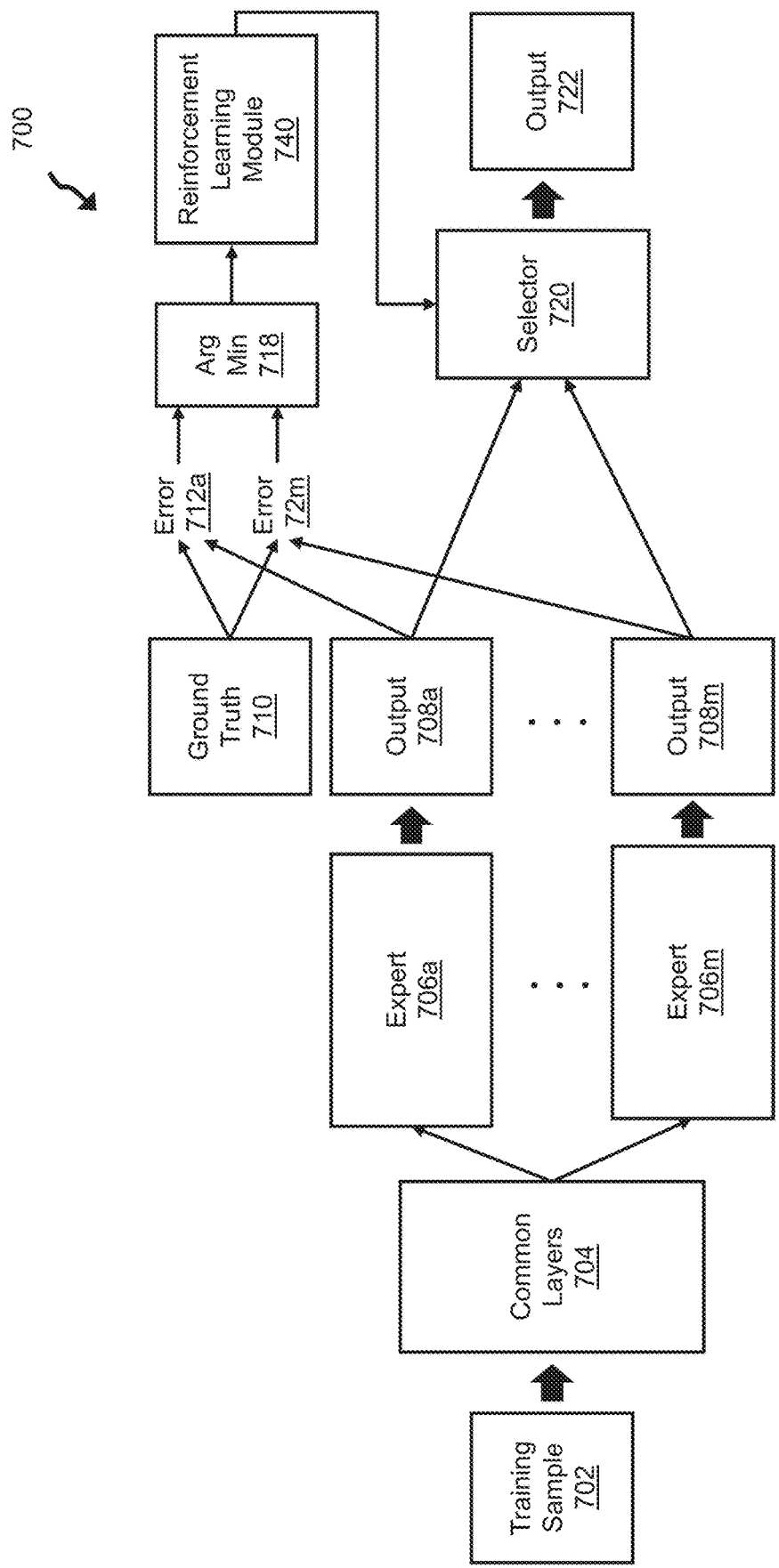
FIG. 7 illustrates an AI model being trained using reinforcement learning to select an expert to train, according to an embodiment.

FIG. 7 illustrates an AI model 700 being trained using reinforcement learning to select an expert to train, according to an embodiment. The components (e.g., experts 706, common layers 704, argmin operation 718, and selector 720), the inputs (e.g., training sample 702 and ground truth 710) and the outputs (e.g., outputs 708, errors 712 and output 722) may be the same structure and perform the same function as those components, inputs and outputs as described in FIG. 6A.

Referring back to FIG. 3, in step 304, the analytics server iteratively selects an expert from the plurality of experts using a policy and an epsilon value indicative of a likelihood of an exploration action or an exploitation action.

The analytics server may randomly select an epsilon value, select an epsilon value from a predetermined distribution of epsilon values, select an epsilon value in response to the environment (e.g., environment 804 in FIG. 8), select an epsilon value in response to one or more criteria, select an epsilon value in response to the number of training epochs, select an epsilon value in response to one or more gradients, and the like.

If a selected epsilon value satisfies an exploration action threshold in the reinforcement learning module (e.g., reinforcement learning module 740 in FIG. 7), then the agents in reinforcement learning (e.g., agents 802 in FIG. 8) may select an expert to train (e.g., using policy 844 in FIG. 8) based on the expert(s) satisfying the one or more criteria (e.g., corresponding to a minimum difference between the ground truth image and the predicted unique contoured image output by an expert).

In an example, an expert may be identified as a candidate expert to be selected for training based on a criteria for all images. As discussed herein, an example criterion includes selecting an expert corresponding to a minimum difference between the ground truth image and the predicted unique contoured image output by the expert. Some of the selected experts may be randomly reassigned with a probability epsilon to a sub-optimal expert according to a policy in the reinforcement learning model (e.g., using policy 844 in FIG. 8). The selection of the expert for training subsequently becomes a selection of the remaining experts.

More specifically, in an example there are three experts (e.g., expert 1, expert 2 and expert 3). The optimal candidate expert is selected based on the expert (or k experts) satisfying one or more criteria. The analytics server may select an epsilon value of 5%. Accordingly, there is a 95% chance that the expert corresponding to the expert that satisfied the one or more criteria will be selected to be trained, and a 5% chance of an expert that did not "win" (based on not satisfying one or more criteria) will be purposefully randomly selected to be trained. Each expert not identified as the "winner" expert has a 2.5% chance of being reassigned as the "winner" expert.

In some embodiments, as training progresses, exploitation actions may be leveraged to refine training the experts. For example, the analytics server may revise the epsilon value (or epsilon selection) such that the likelihood of the exploration action is higher or lower than the likelihood of the exploitation action. Additionally, or alternatively, the analytics server may revise the exploitation action threshold and/or the exploration action threshold.

One distinction between FIG. 6A and FIG. 7 is the use of a reinforcement learning module 740 to select the expert 706 to be trained by the analytics server.

Figure 8:
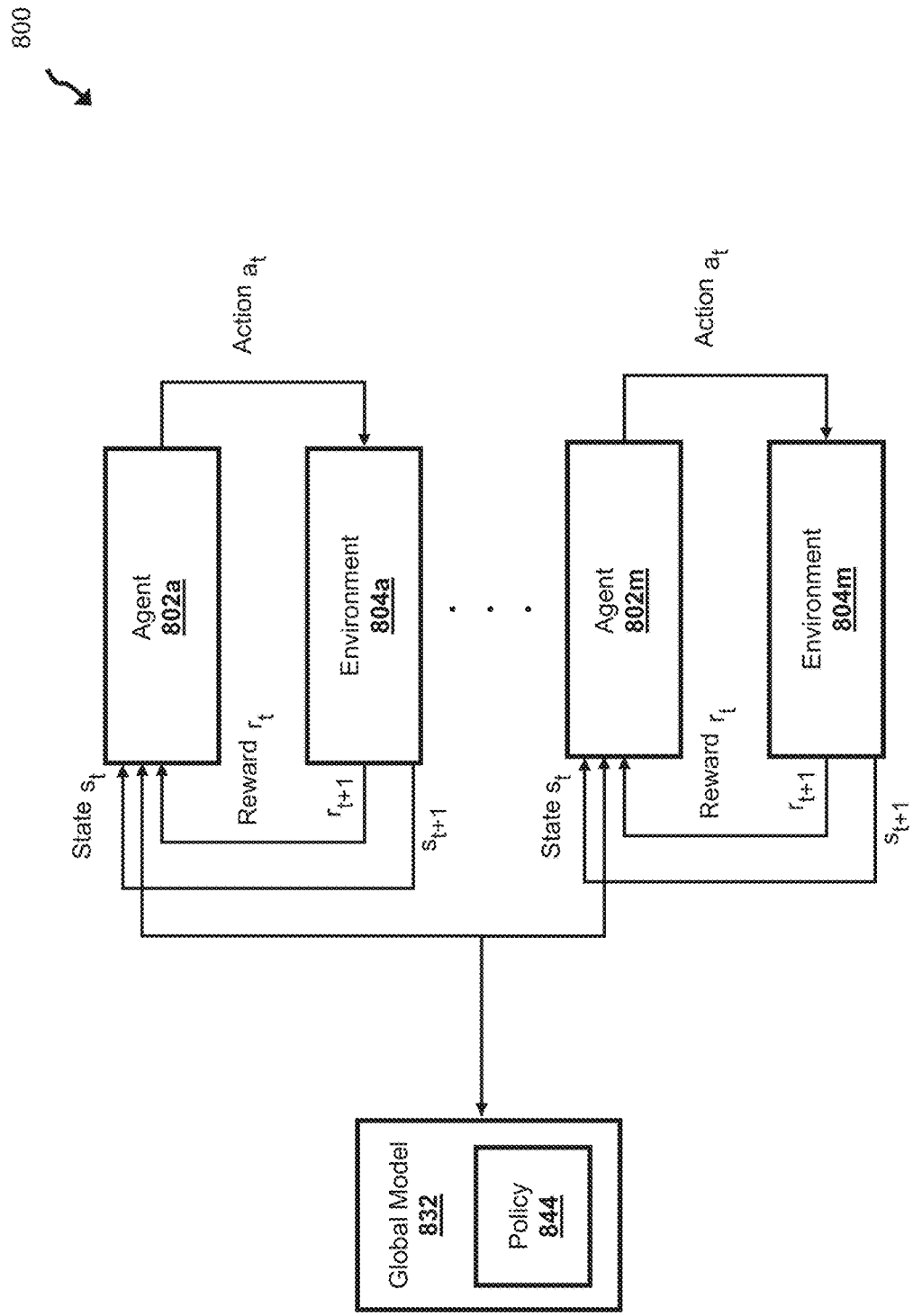
FIG. 8 illustrates a simplified reinforcement learning model, according to an embodiment.

Referring to FIG. 8, an asynchronous advantage actor critic reinforcement learning model 800 is illustrated. The asynchronous advantage actor critic reinforcement learning model 800 is one example of the reinforcement learning module executed by the analytics server (e.g., reinforcement learning module 740 in FIG. 7). Agents use a reinforcement learning method to train themselves/AI model to select an expert to train in the AI model.

In reinforcement learning, an agent 802a to 802m (collectively referred to herein as agent 802) interacts with an environment 804 (e.g., environment 804a to 804m respectively). The agents 802 refer to the learner or trainer (e.g., the analytics server training the AI model or the AI model itself). The environment 804 refers to an accuracy of the experts in learning a preference. That is, the environment 804 refers to a progress of the training. At each time step t (e.g., each iteration), the agent 802 observes a state $s_t$ and selects an action from a set of actions using a policy 844 (e.g., policy $\pi$). The policy 844 maps states (and observations) to actions. The policy 844 gives the probability of taking a certain action when the agent 802 is in a certain state. The possible set of actions may include selecting expert(s) of the plurality of experts to be trained.

The possible set of actions (e.g., action space) may also be arbitrarily defined and depend on the solution space considerations. For example, the solution space may be discretized such that the number of experts selected to be trained is a fixed number of experts, rather than a number of experts on a continuous range. Accordingly, the action space may include actions such as "select one expert," "select four experts," or "don't select any experts."

In other examples, the solution space may be continuous rather than discrete. For example, the action space may include actions such as "select x experts" where the number of selected experts x may vary throughout training, vary based on the criteria, vary based on the number of training epochs, vary based on gradients, and the like. In the event a continuous solution space is implemented, the agents 802 may need to train for longer such that the agents 802 can determine the number of experts to select.

The policy 844 may be a global policy such that the agents 802 share a common policy. The policy 844 is tuned based on the value of taking each action, where the value of selecting the action is defined as the expected reward received when taking that action from the possible set of actions. In some configurations, the analytic server may update the policy 844 using agents operating in other servers (e.g., via federated learning).

The policy 844 may be stored in a global model 832. Using a global model 832 allows each agent 802 to have a more diversified training dataset and eliminates a need for synchronization of models associated with each agent 802. In other configurations, there may be models associated with each agent, and each agent may calculate a reward using a designated machine learning model.

Agents 802 may select actions based on a combination of policy 844 and an epsilon value representative of exploratory actions and exploitation actions. An exploratory action is an action unrestricted by prior knowledge. The exploratory action improves an agent's 802 knowledge about an action by using the explored action in a sequence resulting in a reward calculation. For example, an exploratory action is training an expert that did not win, where a winning expert is an expert that produced an output that satisfied one or more criteria (e.g., selecting an expert resulting in a minimal error when the output was compared with the ground truth). An exploitation action is a "greedy" action that exploits the agent's 802 current action-value estimates. For example, an exploitation action is training an expert that won because it satisfied one or more criteria (e.g., produced an output resulting in the minimal error when the output was compared with the ground truth). In some arrangements, k experts may be selected. For example, out of n experts, k experts may satisfy a criterion (e.g., k experts produce an output corresponding with the k minimum errors when outputs were compared with the ground truth). Accordingly, k experts may be trained.

Additionally or alternatively, one expert may satisfy a criterion (e.g., produce an output corresponding with the minimum error when the output was compared with the ground truth). Out of the n−1 remaining experts, k experts may be selected to be trained using one or more epsilon values and/or policies.

Using epsilon-greedy action selection, for example, the agent 802 balances exploratory actions and exploitation actions. The epsilon value may be the probability of exploration vs exploitation. The agent 802 may select an epsilon value and perform an exploitation action or an exploratory action based on the value of the epsilon and one or more exploitation and/or exploration thresholds. The agents 802 may perform exploitation actions and exploration actions based on the value of epsilon.

Referring back to FIG. 7, the argmin operator 718 is used to identify the expert 706 with the minimum difference between the ground truth image 710 and the predicted unique image output 708. The analytics server will train an expert (e.g., propagate error 712 through the expert) based on an analysis of the expert corresponding to the minimum difference between the ground truth image 710 and each output (e.g., 708*a* to 708*m*), and both the epsilon value and policy (e.g., policy 844 in FIG. 8) determined from the reinforcement learning module 740.

In a non-limiting example, the argmin operator 718 evaluates a minimum error from the received errors (e.g., error 712*a* to error 712*m*). The reinforcement learning module 740 may receive an indication of the expert associated with the minimum error from the argmin operator 718. The reinforcement learning module 740 may determine whether to train the expert associated with the minimum difference between the ground truth image 710 and the output associated with the minimum error based on a selected epsilon value, a policy, and an exploration action threshold and/or an exploitation action threshold.

Additionally, or alternatively, the reinforcement learning module 740 may receive the errors (e.g., error 712*a* to error 712*m*) and determine the expert to train based on the errors 712, a selected epsilon value, a policy, and an exploration action threshold and/or an exploitation action threshold. The argmin operator 718 may determine the minimum error 712 such that the selector 720 selects output 722 based on the output 708 closest to the ground truth 710. Accordingly, the output 708 associated with the expert 706 trained by the analytics server may not be the output selected by the selector 720 to be output 722.

Referring back to FIG. 8, in response to selecting an action (or multiple actions) according to the epsilon value and policy 844, the environment 804 may change, and there may be a new state $s_{t+1}$. The agent 802 may receive feedback, indicating how the action affected the environment 804. In some configurations, the agent 802 determines the feedback. In other configurations, the analytics server may provide feedback.

Referring back to FIG. 3, in step 304, the analytics server iteratively selects an expert based on a policy and an epsilon value indicative of an exploration action and an exploitation action. In some arrangements the analytics server selects k experts.

In step 306, when the epsilon value indicates the exploitation action, the analytics server may select an expert corresponding to a one or more criteria. For example, the analytics server may select an expert that corresponds to a minimum difference between a ground truth image and the predicted preference image (e.g., predicted unique contoured image). The analytics server may determine the expert corresponding to the minimum difference between the ground truth image and the predicted preference image using an argmin operator, for instance.

For example, if the epsilon value satisfies an exploitation action threshold (or otherwise indicates an exploration action), then the agents in reinforcement learning (e.g., agents 802 in FIG. 8) may select an expert to train (e.g., using policy 844 in FIG. 8) based on the expert(s) satisfying the one or more criteria (e.g., corresponding to a minimum difference between the ground truth image and the predicted preference image output by an expert).

In step 308, when the epsilon value indicates the exploration action, an expert is randomly selected. The randomly selected expert may be an expert different from the expert corresponding to the minimum difference between the ground truth image and the predicted preference image (e.g., the expert selected when the epsilon value indicates the exploitation action in step 306). The analytics server may also select an epsilon value from a predetermined distribution of epsilon values, select an epsilon value in response to the environment (e.g., environment 804 in FIG. 8), select an epsilon value in response to one or more criteria, select an epsilon value in response to the number of training epochs, select an epsilon value in response to one or more gradients, and the like.

In an example, the analytics server (or agents 802 in FIG. 8) may make a first suggestion on the expert selection based on a criteria for all images. As discussed herein, an example criterion includes identifying a candidate expert corresponding to a minimum difference between the ground truth image and the predicted unique contoured image output by the expert. Some of the selected experts may be randomly reassigned with a probability epsilon to a sub-optimal expert according to a policy in the reinforcement learning model (e.g., using policy 844 in FIG. 8). That is, the selection of the expert for training subsequently becomes a selection of the remaining experts.

More specifically, in a non-limiting example there are three experts (e.g., expert 1, expert 2 and expert 3). An optimal candidate expert is selected based on the expert (or k experts) satisfying one or more criteria. The analytics server may select an epsilon value of 5%. Accordingly, there is a 95% chance that the expert corresponding to the expert that satisfied the one or more criteria will be selected to be trained, and a 5% chance of an expert that did not "win" (based on not satisfying one or more criteria) will be purposefully randomly selected to be trained. In the example, each expert not identified as the "winner" expert has a 2.5% chance of being reassigned as the "winner" expert.

In some embodiments, as training progresses, exploitation actions may be leveraged to refine training the experts. For example, the analytics server may revise the epsilon value (or epsilon selection) such that the likelihood of the exploration action is higher or lower than the likelihood of the exploitation action. Additionally, or alternatively, the analytics server may revise the exploitation action threshold and/or the exploration action threshold.

In step 310, the analytics server iteratively calculates a reward value indicative of a difference between the ground truth image and the predicted preference image (e.g., predicted unique contouring image) generated via the selected expert.

Referring back to FIG. 8, the agent 802 learns (e.g., reconfigures its policy 844) by taking actions and analyzing the rewards received. A reward functions can include, for example, $R(s_t)$, $R(s_t, a_t)$, and $R(s_t, a_t, s_{t+1})$. In some configurations, the reward function may be root mean square error, square error function, absolute error function, and the like.

Each iteration (or after multiple iterations and/or steps), the agent 802 selects a policy 844 (and an action) based on the current state $s_t$, the epsilon value, and the agent 802 (or the machine learning model) calculates a reward. Each iteration, the agent 802 (or machine learning model) iteratively increases a summation of rewards. One goal of reinforcement learning is to determine a policy 844 that maximizes (or minimizes) the cumulative set of rewards, determined via the reward function.

The analytics server weighs policy 844 based on the rewards determined at each step (or series of steps) such that certain policy 844 (and actions) are encouraged and/or discouraged in response to the environment 804 being in a certain state. The policy 844 is optimized by taking the gradient of an objective function (e.g., a reward function) to maximize a cumulative sum of rewards at each step, or after a predetermined number of steps (e.g., a delayed reward).

In some embodiments, the analytics server may inject parameter noise into the reinforcement learning model 800. Parameter noise may result in greater exploration and more successful reinforcement learning models 800 by adding noise to the parameters of the policy selection.

Referring back to FIG. 3, in step 312, the analytics server iteratively trains the policy until the policy satisfies an accuracy threshold based on maximizing the reward. For example, in FIG. 8, the agents 802 trains themselves by choosing the action(s) based on policies 844 that provide the highest cumulative set of rewards. The agents 802 of the machine learning model 800 may continue training until a predetermined threshold has been satisfied. For instance, the agents 802 may train the machine learning model 800 until a predetermined number of steps (or series of steps called episodes, or iterations) have been reached. Additionally, or alternatively, the agents 802 may train the machine learning model 800 until the reward function satisfies a threshold value for a predetermined number of steps.

The analytics server may determine weights to maximize the objective function (e.g., reward function) during training as shown in Equation 1 below.

$$\nabla_\theta J(\theta) = \frac{1}{m} \sum_{k=1}^{m} \sum_{t=0}^{T} \nabla_\theta \log \pi_\theta(a_t \mid s_t)((Q(s_t, a_t) - V_\theta(s_t))$$ Equation (1)

log $\pi_\theta(a_t|s_t)$ is an agent term
$Q(s_t, a_t) - V_\theta(s_t)$ is a critic term
T is a number of steps in an episode
m is a number of episodes In Equation 1 above, agents 802 may approximate both the value function $V_\theta(s_t)$ in the critic term and the policy function log $\pi_\theta(a_t|s_t)$ of the agent term. The agent term represents the probability of selecting a policy 844 of taking an action $a_t$ given the state $s_t$. The state-action value Q function in the critic term gives the expectation of the cumulative reward according to the current state $s_t$ after taking an action $a_t$ according to the current policy 844. The value function in the critic term gives the expectation of the cumulative rewards at each step. The critic term may be approximated using Q actor-critic techniques, advantage actor-critic techniques, temporal difference (TD) actor-critic techniques, TD actor-critic techniques with a discount value, and natural actor-critic techniques, among others.

As shown, the analytics server trains the reinforcement learning model 800 using, for example, asynchronous advantage actor critic reinforcement learning. In other embodiments, the analytics server trains the reinforcement learning model 800 using other reinforcement learning techniques. The analytics server utilizes various asynchronous agents 802a to 802m associated with a corresponding environment to tune a policy 844. The analytics server may employ a GPU to instantiate multiple learning agents 802 in parallel. Each agent 802 asynchronously performs actions and calculates rewards using a global model (such as a deep neural network). In some embodiments, the policy 844 may be updated every step (or predetermined number of steps) based on the cumulative rewards determined by each agent 802. Each agent 802 may contribute to the policy 844 such that the total knowledge of the model 832 increases and the policy 844 learns how to optimize expert selection/training. Each time the model 832 is updated (e.g., after every step and/or predetermined number of steps), the analytics server propagates new weights back to the agents 802 such that each agent shares a common policy 844.

Generally, the policy 844 selects an action based on maximizing (or minimizing) the reward. The reward is based on the error, which is dependent on the ground image. Each ground image is associated with one or more preferences attributes (e.g., patient metadata, attributes of a patient, regional preferences, clinical preferences, clinician preferences, and the like).

In some configurations, the agents 802 may determine that k number of experts are trained each iteration. Accordingly, error is propagated to k experts, while the total number of experts minus k are not trained.

Referring back to FIG. 6A, selector 620 will select the output 608 associated with the minimum error 612 to be displayed as the output 622. The output 622 represents the segmented training sample 602. Accordingly, during training, the AI model 600 receives a single input (e.g., training sample 602) and produces a single output (e.g., output 622).

As shown in FIG. 6A each expert (e.g., expert 606*a* and expert 606*m*) may have the same architecture (e.g., FIG. 6C). In other embodiments, the AI model 600 may include a single layer of experts 606 (as shown) or multiple layers of experts.

Multiple layers of experts may increase the depth of the AI model (e.g., AI model 400 in FIG. 4) by increasing the depth of the expanding path. Different expert layers at different depths may exponentially increase the number of preferences produced by the experts. Each individual path among each expert may produce a unique contour For example, two layers with two experts may produce four different paths for the information flow. Increasing the depth allows the AI model to capture different information about the final segmented structure and have different receptive field son the original image (e.g., medical image 402 in FIG. 4).

Figure 9:
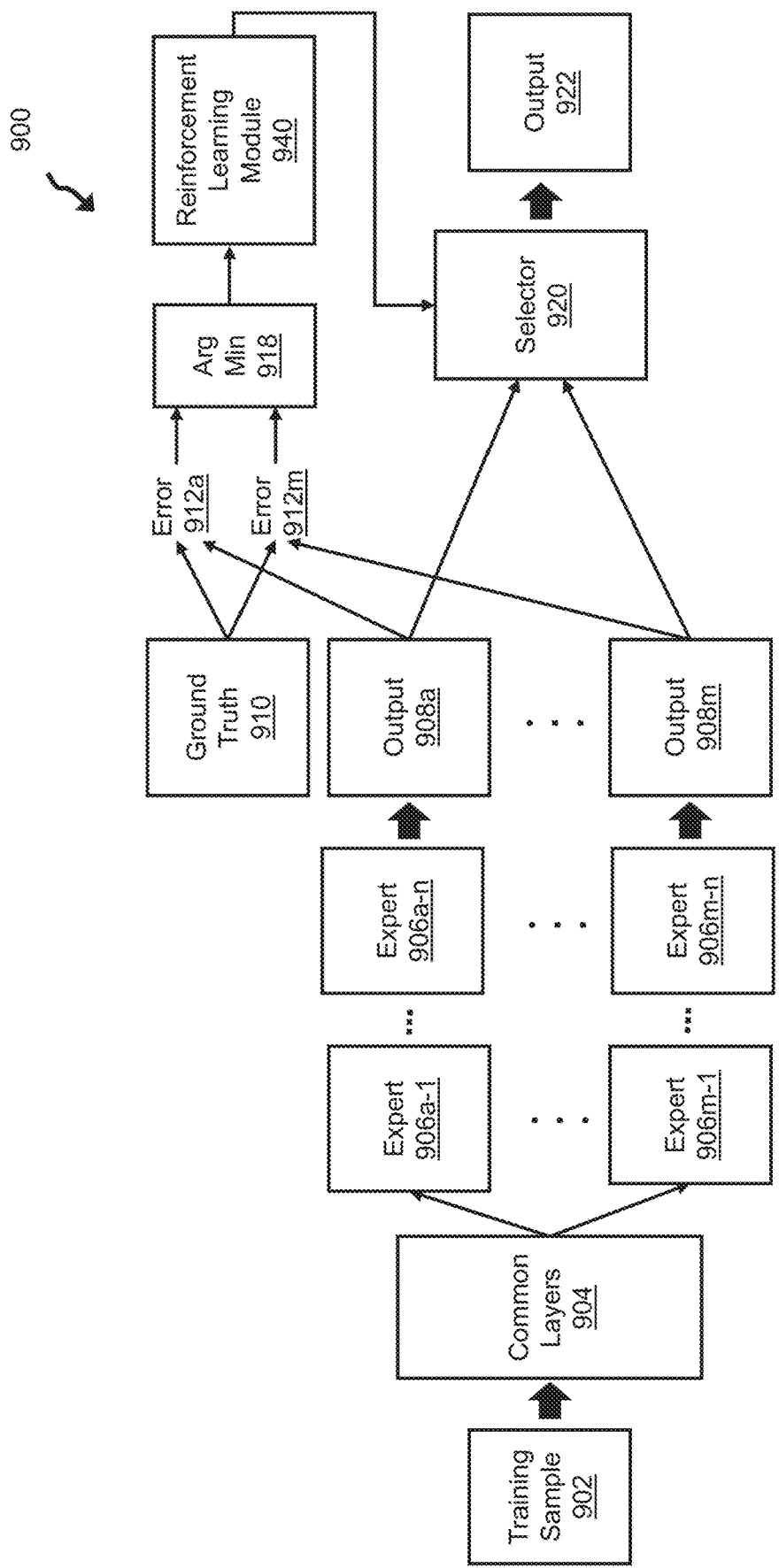
FIG. 9 illustrates multiple layers of experts in the AI model, according to an embodiment.

FIG. 9 illustrates multiple layers of experts in an AI model 900, according to an embodiment. Experts 906*a*-1 to experts 906*a*-*n* may have the same architecture or different architectures (or some combination). For example, some experts may be gated neural networks, recurrent neural networks, convolutional neural networks, U-nets, and the like. Similarly, experts 906*m*-1 to experts 906*m*-*n* may have the same architecture or different architecture (or some combination). Further, experts 906*a*-1 to experts 906*a*-*n* may be the same architecture or different architecture (or some combination) as experts 906*m*-1 to experts 906*m*-*n*. In some configurations, each of the experts 906 in the layers of experts may be trained to segment different portions of the training sample 902. Additionally, or alternatively, each of the experts 906 in the layers of experts may be trained to further refine the segments determined by the experts in the preceding expert layers.

In some embodiments, the location of the experts is flexible in the AI model and the placement of the experts in the AI model may be optimized. For example, any suitable evolutionary algorithm may optimize expert placement in the AI model by back propagating through various expert pathways over others.

Figure 10:
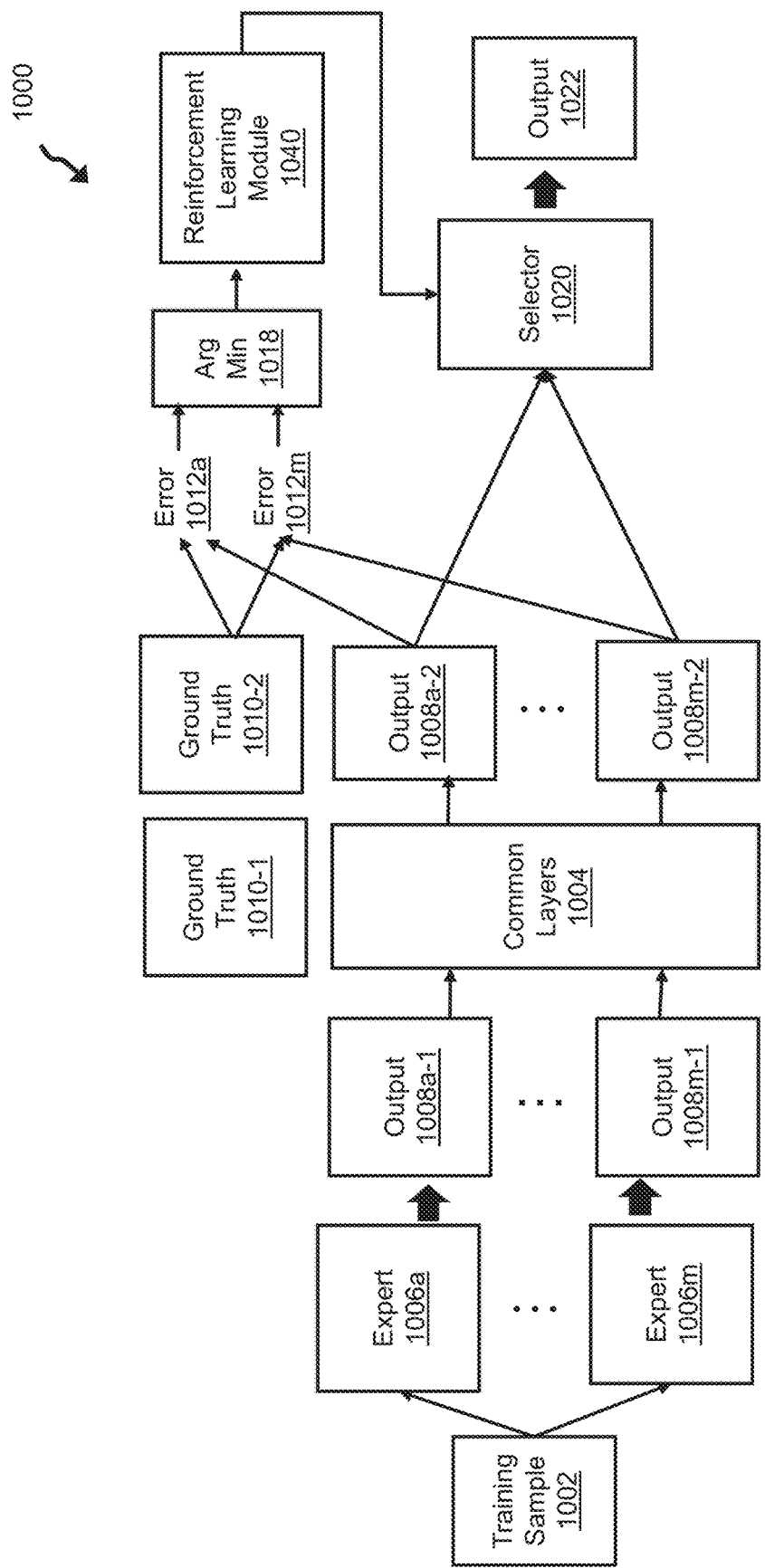
FIG. 10 illustrates expert layers employed in the AI model located before the common layer, according to an embodiment.

FIG. 10 illustrates expert layers employed in the AI model 1000 located before the common layer. The components (e.g., experts 1006, common layers 1004, reinforcement learning module 1040, argmin operation 1018, and selector 1020), the inputs (e.g., training sample 1002 and ground truth 1010) and the outputs (e.g., outputs 1008, errors 1012 and output 1022) may be the same structure and perform the same function as those components, inputs and outputs as described in FIG. 7.

One distinction between FIG. 7 and FIG. 10 is the placement of the experts 1006. In FIG. 10, the experts 1006 receive the training sample 1002. In some embodiments, the experts 1006 may receive a raw training sample 1002. In other embodiments, the experts 1006 may receive pre-processed training samples 1002. Pre-processing the training sample may include normalizing the training sample 1002, scaling the training sample 1002, flattening the training sample 1002, transforming the training sample 1002 into a different dimension, and the like.

Each expert 1006 may produce an output (e.g., expert 1006*a* may produce output 1008*a*-1 and expert 1006*m* may produce output 1008*m*-1). The outputs 1008*a*-1 and 1008*m*-1 may indicate of the training sample 1002 including preferences (e.g., segmented version of the training sample 1002). The analytics server feeds the outputs 1008*a*-1 and 1008*m*1 into the common layers to extract feature maps of the outputs 1008*a*-1 and 1008*m*-1. The common layers 1004 output 1008*a*-2 and 1008*m*-2, which may represent feature map versions (and/or down-sampled versions) of outputs 1008*a*-1 and 1008*m*1.

In some configurations, the analytics server may feed the ground truth 1010-1 into the common layer 1004 such that the common layer produces ground truth 1010-2. Ground truth 1010-2 may represent a feature map version (and/or a down-sampled version) of ground truth 1010-1. The analytics server may compare ground truth 1010-2 to the outputs 108*a*-2 and 1008*m*-2 to calculate error 1012 used in the remainder of the AI model 1000 architecture.

Figure 11A:
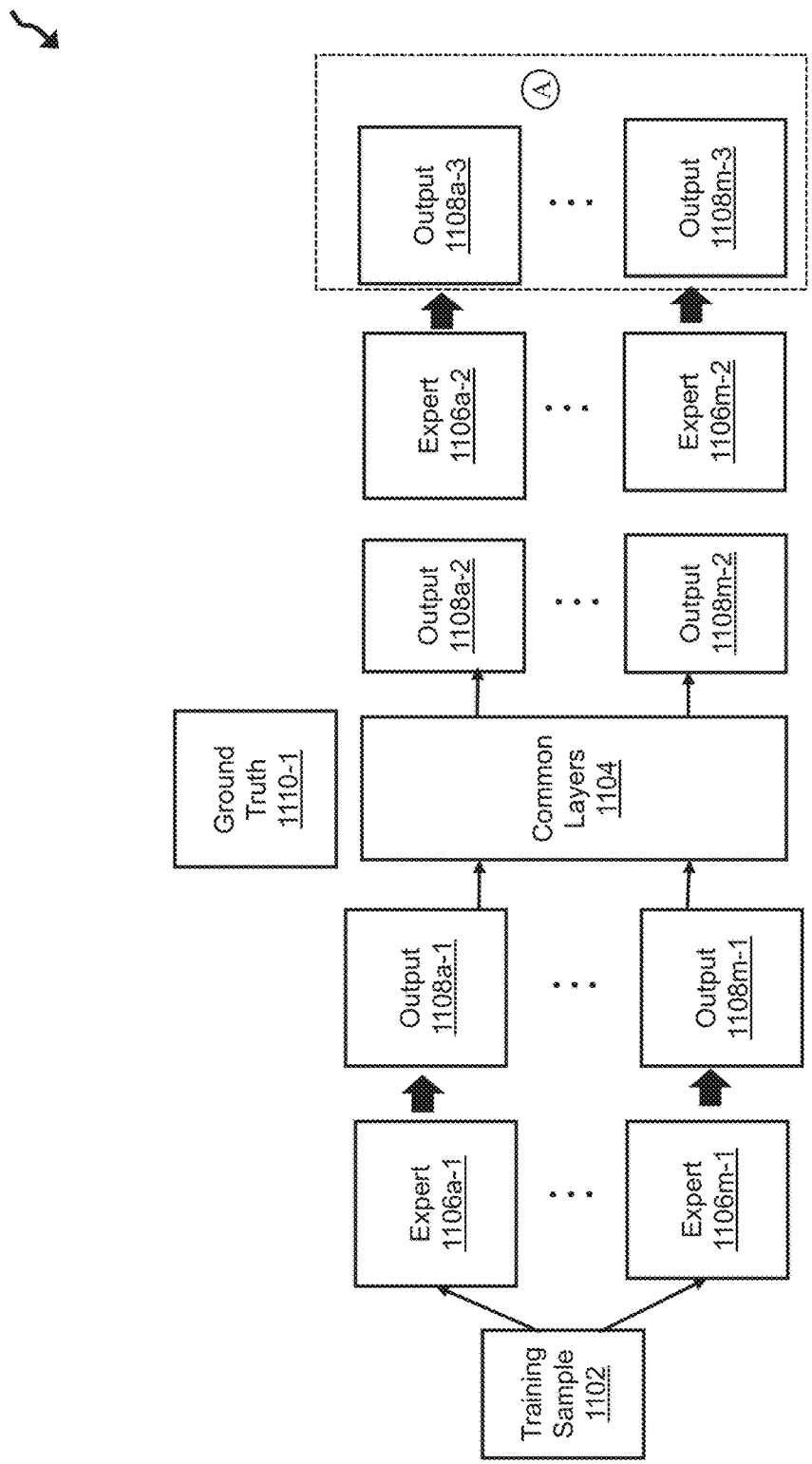
FIGS. 11A-11B illustrate expert layers employed in the AI model located between the common layers, according to an embodiment.

FIG. 11A illustrates expert layers employed in the AI model 1100 located between the common layer. The components (e.g., experts 1106, common layers 1104, argmin operation 1118, reinforcement learning module 1140, and selector 1120), the inputs (e.g., training sample 1102 and ground truth 1110) and the outputs (e.g., outputs 1108, errors 1112 and output 1122) may be the same structure and perform the same function as those components, inputs and outputs as described in FIG. 7.

One distinction between FIG. 7 and FIG. 11A is the placement of the experts 1106. Similarly to FIG. 10, in FIG. 11A, the experts 1106 receive the training sample 1102. The experts 1106 may receive a raw training sample 1102 or a pre-processed training sample 1102, where pre-processing may include normalizing the training sample 1102, scaling the training sample 1102, flattening the training sample 1102, transforming the training sample 1102 into a different dimension, and the like.

Similarly to FIG. 10, in FIG. 11A, the experts 1106 may each produce an output (e.g., expert 1106*a*-1 may produce output 1108*a*-1 and expert 1006*m*-1 may produce output 1008*m*-1) where the outputs 1108*a*-1 and 1108*m*-1 may indicate versions of the training sample 1102 including preferences (e.g., segmented version of the training sample 1102). The analytics server feeds the outputs 1108*a*-1 and 1108*m*-1 into the common layers 1104 to extract feature maps of the outputs 1108*a*-1 and 1108*m*-1. The common layer 1104 output 1108*a*-2 and 1108*m*-2, which may represent feature map versions (and/or down-sampled versions) of outputs 1108*a*-1 and 1108*m*-1.

Similarly to FIG. 10, in FIG. 11A, the analytics server may feed the ground truth 1110-1 into the common layer 1104 such that the common layer produces ground truth 1110-2 (depicted in FIG. 11B), where ground truth 1110-2 may represent a feature map version (and/or a down-sampled version) of ground truth 1110-1.

The analytics server feeds the feature map versions (and/or down-sampled versions) of the training sample 1102 produced from the common layers 1104 (e.g., outputs 1108*a*-2 and 1108*m*-2) to subsequent experts 1106. For example, experts 1106*a*-2 and 1106*m*-2 may be similar to experts 1106*a*-1 and 1106*m*-1. Additionally, or alternatively, experts 1106*a*-2 and 1106*m*-2 may be different from experts

1106*a*-1 and 1106*m*-1. Additionally, or alternatively, the experts 1106*a*-2 and 1106*m*-2 may be trained to segment different portions of the training sample 1102 (as compared to experts 1106*a*-1 and experts 1106*m*-1). Additionally, or alternatively, experts 1106*a*-2 and 1106*m*-2 may be trained to further refine the segments determined by experts 1106*a*-1 and 1106*m*-1. Each expert 1106*a*-2 and 1106*m*-2 may generate outputs 1108*a*-3 and 1108*m*-3.

Figure 11B:
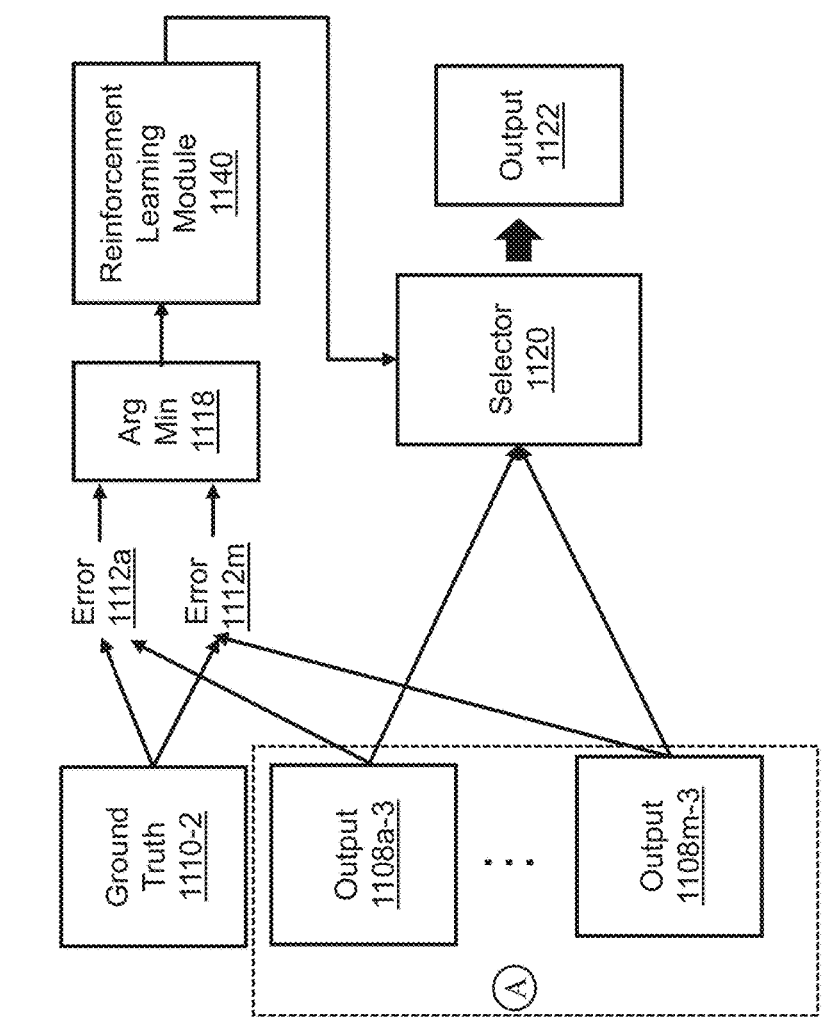

FIG. 11A proceeds to FIG. 11B. As shown in FIG. 11B, outputs 1108*a*-3 and 1108*m*-3 are compared to the ground truth image 1110-2 to calculate error 1112 (e.g., error 1112*a* associated with output 1108*A*-3 and ground truth 1110-2 and error 1112*m* associated with output 1108*m*-3 and ground truth 1110-2) used in the remainder of the AI model 1100 architecture.

Figure 12:
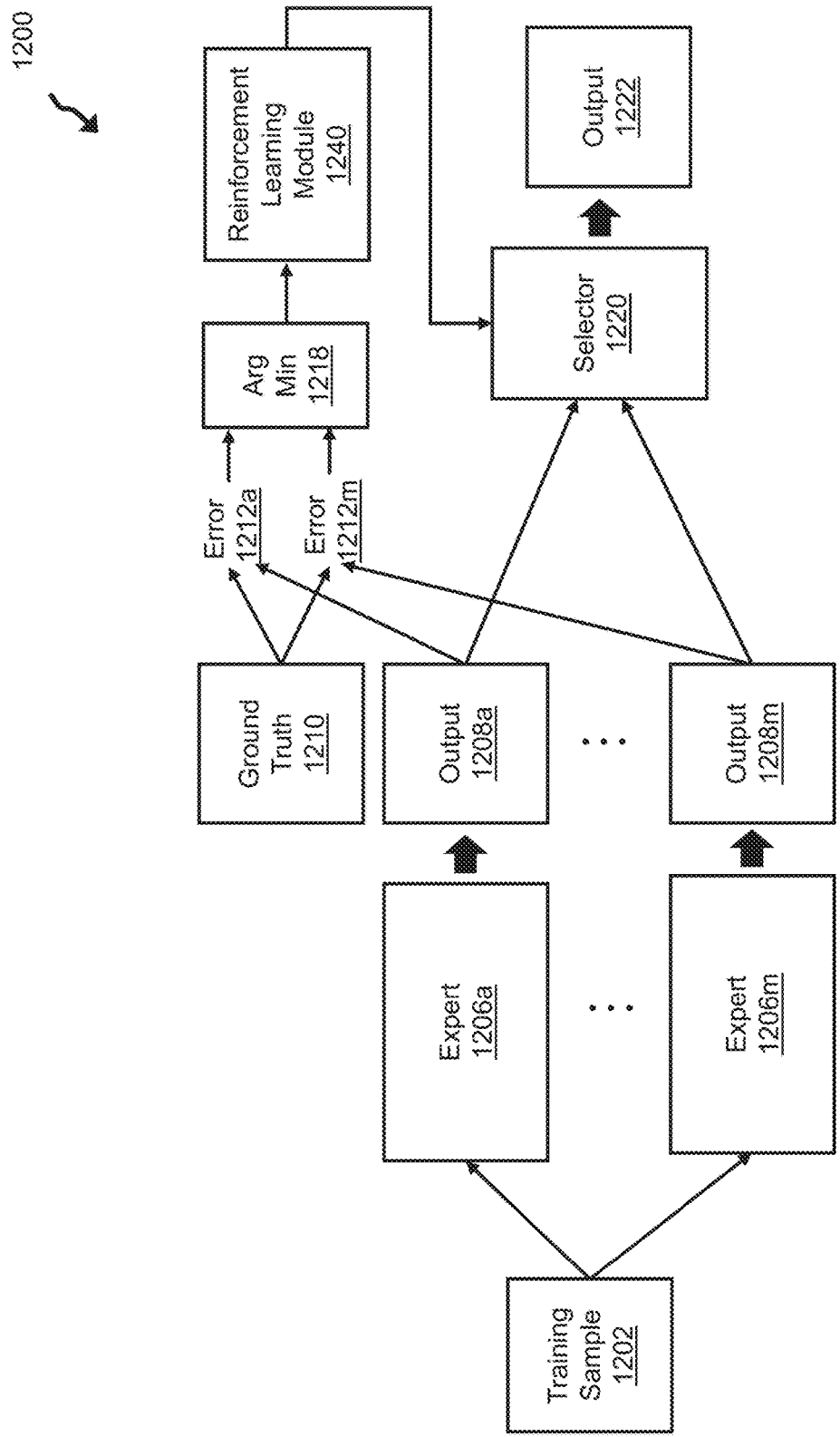
FIG. 12 illustrates expert layers employed in the AI model without any common layers, according to an embodiment.

FIG. 12 illustrates expert layers employed in the AI model 1200 without any common layers. The components (e.g., experts 1206, argmin operation 1218, reinforcement learning module 1240, and selector 1220), the inputs (e.g., training sample 1202 and ground truth 1210) and the outputs (e.g., outputs 1208, errors 1212 and output 1222) may be the same structure and perform the same function as those components, inputs and outputs as described in FIG. 7.

One distinction between FIG. 7 and FIG. 12 is the placement of experts 1206. In FIG. 12, the experts 1206 receive the training sample 1202. Similarly to FIGS. 10, and 11A, the experts may receive a raw training sample 1202 or a pre-processed training sample 1202, where pre-processing may include normalizing the training sample 1202, scaling the training sample 1102, flattening the training sample 1202, transforming the training sample 1202 into a different dimension, and the like.

Similarly to FIG. 10, in FIG. 12, the experts 1206 may each produce an output (e.g., expert 1206*a* may produce output 1208*a* and expert 1206*m* may produce output 1208*m*) where the outputs 1208*a*-1 and 1208-1 may indicate versions of the training sample 1202 including preferences (e.g., segmented versions of the training sample 1202). The analytics server may compare the outputs 1208 to the ground truth 1210 to calculate error 1212 used in the remainder of the AI model 1200 architecture.

Additionally, or alternatively, the analytics server may employ neural architecture search (NAS) to learn an optimal AI model (e.g., AI models 700, 900, 1000, 1100). For example the analytics server may employ NAS to learn an optimal placement for experts in the AI model, an optimal number of experts to learn the preferences, an optimal combination of experts that produce preferences, and the like. Accordingly, an arbitrary network may benefit from being configured with local experts.

Figure 13:
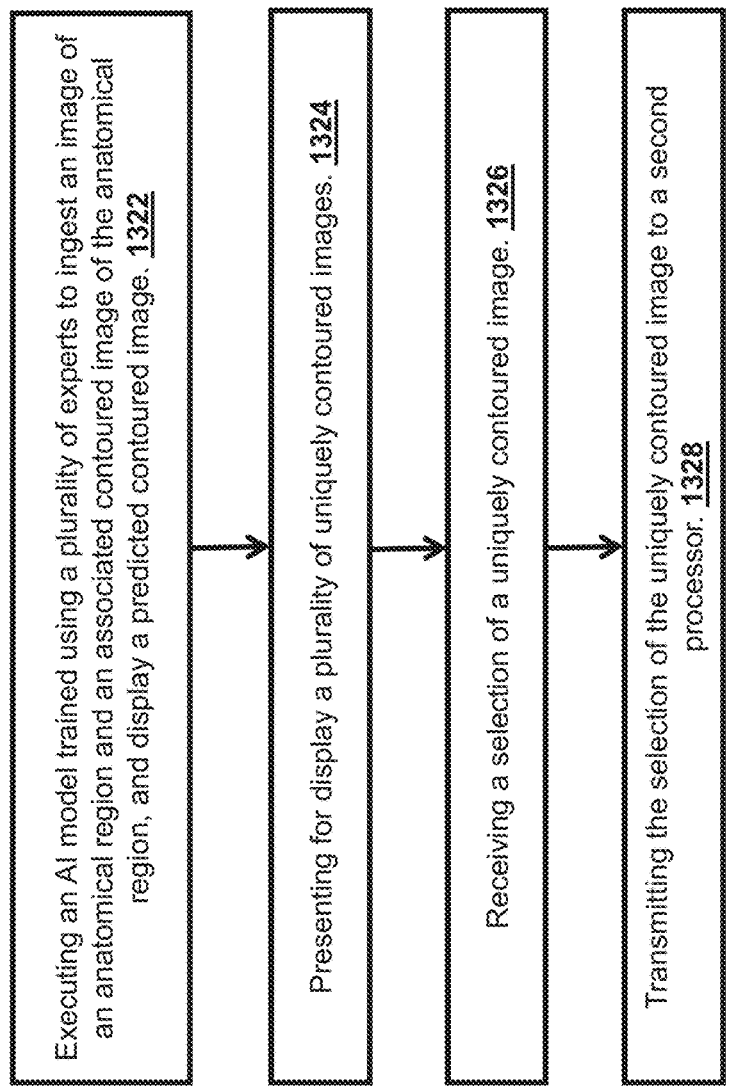
FIG. 13 illustrates an additional flow diagram of an AI preference-aware image segmentation system, according to an embodiment.

FIG. 13 illustrates an additional flow diagram of an AI preference-aware image segmentation system, according to an embodiment. The method 1300 includes steps for deploying an AI model (e.g., during an inference phase or a testing phase), according to an embodiment. The method 1300 may include steps 1322-1328. However, other embodiments may include additional or alternative steps, or may omit one or more steps altogether.

The method 1300 is described as being executed by an analytics server, such as the analytics server described in FIG. 2. The analytics server may employ one or more CPUs and GPUs to perform one or more steps of method 1300. The CPUs and/or GPUs may be performed in part by the analytics server and in part by one or more other servers and/or computing devices. The servers and/or computing devices employing the CPUs and GPUs may be local and/or remote (or some combination). For example, one or more virtual machines in a cloud may employ one or more CPUs and GPUs to perform one or more steps of method 1300. One or more steps of method 1300 may be executed by any number of computing devices operating in the distributed computing system described in FIG. 2. For instance, one or more computing devices may locally perform part or all of the steps described in FIG. 13.

In step 1322, the analytics server executes an AI model (e.g., AI model 211 in FIG. 2) trained using a plurality of experts to ingest an image of an anatomical region, and an associated contoured image of the anatomical region (e.g., FIGS. 6A-12), and display a predicted contoured image.

Figure 14:
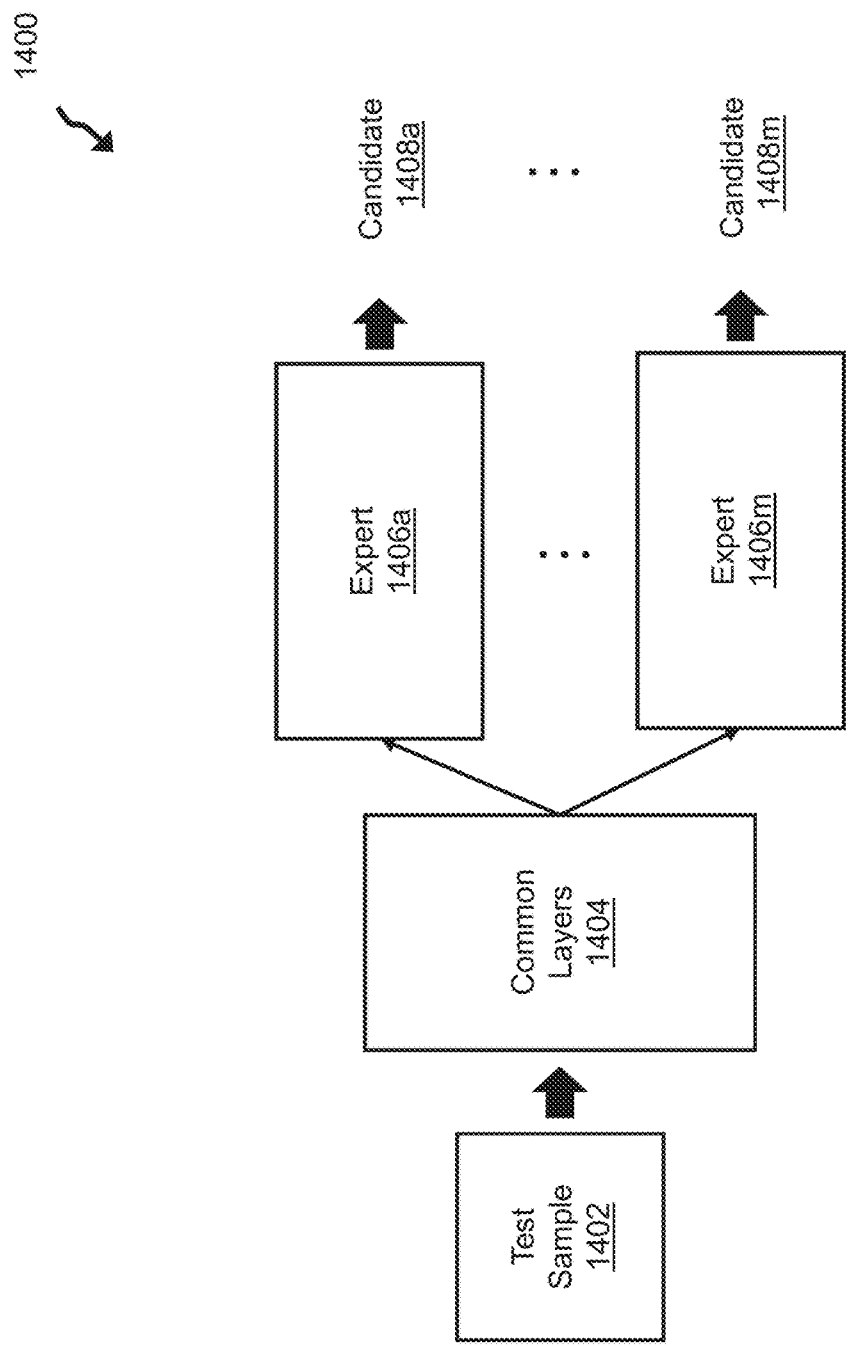
FIG. 14 illustrates a non-limiting example of a workflow of executing a trained AI model, according to an embodiment.

FIG. 14 illustrates a non-limiting example of a workflow of executing a trained AI model 1400. In this example, the analytics server provides a test sample 1402 to common layers 1404 of the AI model 1400. The test sample 1402 may be a 2D or 3D image of an anatomical region of a patient with at least one PTV and/or OAR. In some embodiments, the test sample 1402 may be transformed (before the common layer 1404 and/or as part of the common layers 1404) into a different dimension (e.g., from 3D to 2D or from 2D to 3D) using any suitable method.

The common layers 1404 may be the same common layers configured during training (e.g., common layers 604 in FIG. 6B). Similarly, the experts 1406*a* to 1406*m* (collectively referred to as experts 1406) may be the same expert heads configured during training (e.g., experts 606 in FIG. 6C).

Referring back to FIG. 13, in step 1324, the analytics server will present for display a plurality of uniquely contoured images. In an example, the analytics server may transmit, for display, the plurality of uniquely segmented (or contoured) images to an end-user device (e.g., end-user devices 240 in FIG. 2). Additionally, or alternatively, the analytics server may transmit the plurality of uniquely segmented images to a server (e.g., server 240*c* in FIG. 2) or a database (e.g., database 240*b* in FIG. 2).

Referring back to FIG. 14, the analytics server displays a candidate output 1408. Expert 1406*a* will output candidate 1408*a* to be displayed by the analytics server and expert 1406*m* will output candidate 1408*m* to the analytics server (where candidates 1408*a* and 1408*b* are collectively referred to as candidates 1408). Each candidate 1408 represents segmenting testing sample 1402 according to a unique image segmentation preference. However, as described herein, other candidates will be generated when the AI model is trained to learn preferences of any function over voxel space. Accordingly, during testing, the AI model 1400 receives a single input (e.g., test sample 1402) and produces multiple outputs (e.g., candidates 1408). The AI model 1400 outputs multiple candidates 1408 because multiple ground truths exist for a single test sample 1402.

Referring back to FIG. 13, in step 1326, the analytics server may receive a selection of an image with an associated preference (e.g., a uniquely contoured image). For example, referring to FIG. 14, a user may select a candidate 1408 (e.g., using an end-user device 240 in FIG. 2) from the candidates 1408 output by the AI model 1400. In some embodiments, the user may create a custom candidate on a continuum of the displayed candidates 1408. For example, the analytics server may softmax candidates 1408 in response to user inputs such that a custom candidates is created from candidates 1408. The custom candidate may include various combinations of preferences of each of the experts. The analytics server may create the preference associated with the custom candidate by weighting portions of each expert and/or combining experts.

In some embodiments, the analytics server may store the custom preferences (including the custom candidates). In some embodiments, the analytics server associates preferences with medical professionals.

Referring back to FIG. 13, in step 1328, the analytics server may transmit the selection of the image with the associated preference (e.g., uniquely segmented image) to a second processor. For example, one or more downstream applications may receive the segmented image according to the medical professional's preference, the institutions preferences, the regional preferences, the patient attributes, patient metadata, and/or some combination, and automatically determine a treatment plan based on the segmented PTVs and/or OARs in the segmented image. In an example, the analytics server may transmit the selection of the uniquely segmented image to an end-user device (e.g., end-user devices 240 in FIG. 2). Additionally, or alternatively, the analytics server may transmit the image with the associated preference (e.g., selection of the uniquely contoured image) to a server (e.g., server 240c in FIG. 2) or a database (e.g., database 240b in FIG. 2). Image segmentation may be one step in a sequence of steps used to determine a patient treatment plan (including determining an area to be radiated, a radiation dose, an angle of radiation, and the like).

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What we claim is:

1. A method comprising:
   iteratively training, by a processor, an artificial intelligence model having a plurality of experts, where each expert is configured to predict a unique contoured image for an anatomical region depicted in an image in accordance with a preference attribute, wherein with each iteration, the processor:
   selects an expert from the plurality of experts based on a policy and an epsilon value indicative of a likelihood of an exploration action and an exploitation action, each expert configured to predict a unique prediction,
   wherein when the epsilon value indicates the exploitation action, the processor selects the expert based on the expert corresponding to a minimum difference between a ground truth image and the predicted unique contoured image generated by the expert,
   wherein when the epsilon value indicates the exploration action, the processor randomly selects the expert, the randomly selected expert being an expert from the plurality of experts different from the expert corresponding to the minimum difference between the ground truth image and the predicted unique contoured image; and calculates a reward value indicative of a difference between the ground truth image and the predicted unique contoured image generated via the selected expert, wherein the processor iteratively trains the policy until the policy satisfies an accuracy threshold based on maximizing the reward.

2. The method of claim 1, wherein the artificial intelligence model further comprises a common layer that is executed before at least one expert within the plurality of experts, the common layer configured to perform at least one of a group of: normalize at least a part of the image, scale the image, flatten the image, extract features from the image, and transform the dimensionality of the image.

3. The method of claim 2, wherein the common layer is also executed after at least one expert within the plurality of experts.

4. The method of claim 1, further comprising training, by the processor, the selected expert using a supervised training protocol.

5. The method of claim 1, further comprising:
revising, by the processor, the epsilon value, such that the likelihood of the exploration action is higher or lower than the likelihood of the exploitation action.

6. The method of claim 1, wherein each expert corresponds to a contouring preference.

7. The method of claim 1, wherein each expert corresponds to an end-user or a group of end-users.

8. The method of claim 1, wherein the policy identifies the expert based on the preference attribute present in the ground truth image.

9. The method of claim 1, wherein the policy identifies the expert based on an attribute of a patient depicted within the ground truth image.

10. A method comprising:
executing, by a processor, an artificial intelligence model trained using a plurality of experts to ingest an image of an anatomical region and an associated contoured image of the anatomical region, and display a predicted contoured image each expert configured to predict a unique prediction;
presenting, by the processor, for display, a plurality of uniquely contoured images;
receiving, by the processor, a selection of a uniquely contoured image; and
transmitting, by the processor, the selection of the uniquely contoured image to a second processor.

11. The method of claim 9 further comprising:
receiving, by the processor, a request for a custom contoured image, the custom contoured image based on one or more of the plurality of uniquely contoured images.

12. The method of claim 11, further comprising:
generating, by the processor, the custom contoured image based on weighted portions of one or more selected experts of the plurality of experts.

13. The method of claim 9, wherein the trained artificial intelligence model comprises a common layer that is executed before at least one expert within the plurality of experts, the common layer configured to perform at least one of a group of: normalize at least a part of the image, scale the image, flatten the image, extract features from the image, and transform the dimensionality of the image.

14. The method of claim 9, wherein each expert is trained using a supervised training protocol.

15. The method of claim 9, wherein each expert corresponds to a contouring preference.

16. The method of claim 9, wherein each expert corresponds to an end-user or a group of end-users.

17. A system comprising:
a server comprising a processor and a non-transitory computer-readable medium containing instructions that when executed by the processor cause the processor to perform operations comprising:
iteratively train an artificial intelligence model having a plurality of experts, where each expect is configured to predict a unique contoured image for an anatomical region depicted in an image in accordance with a preference attribute;
select an expert from the plurality of experts based on a policy and an epsilon value indicative of a likelihood of an exploration action and an exploitation action, each expert configured to predict a unique prediction,
wherein when the epsilon value indicates the exploitation action, the processor selects the expert based on the expert corresponding to a minimum difference between a ground truth image and the predicted unique contoured image generated by the expert,
wherein when the epsilon value indicates the exploration action, the processor randomly selects the expert, the randomly selected expert being an expert from the plurality of experts different from the expert corresponding to the minimum difference between the ground truth image and the predicted unique contoured image; and
calculate a reward value indicative of a difference between the ground truth image and the predicted unique contoured image generated via the selected expert,
wherein the processor iteratively trains the policy until the policy satisfies an accuracy threshold based on maximizing the reward.

18. The system according to claim 17, wherein the artificial intelligence model comprises a common layer that is executed before at least one expert within the plurality of experts, the common layer configured to perform at least one of a group of: normalize at least a part of the image, scale the image, flatten the image, extract features from the image, and transform the dimensionality of the image.

* * * * *